Nov. 29, 1955    E. KOLISCH    2,725,193
COMPUTING EQUIPMENT FOR LOADING CARGO AIRCRAFT
Filed Sept. 11, 1953    5 Sheets-Sheet 1
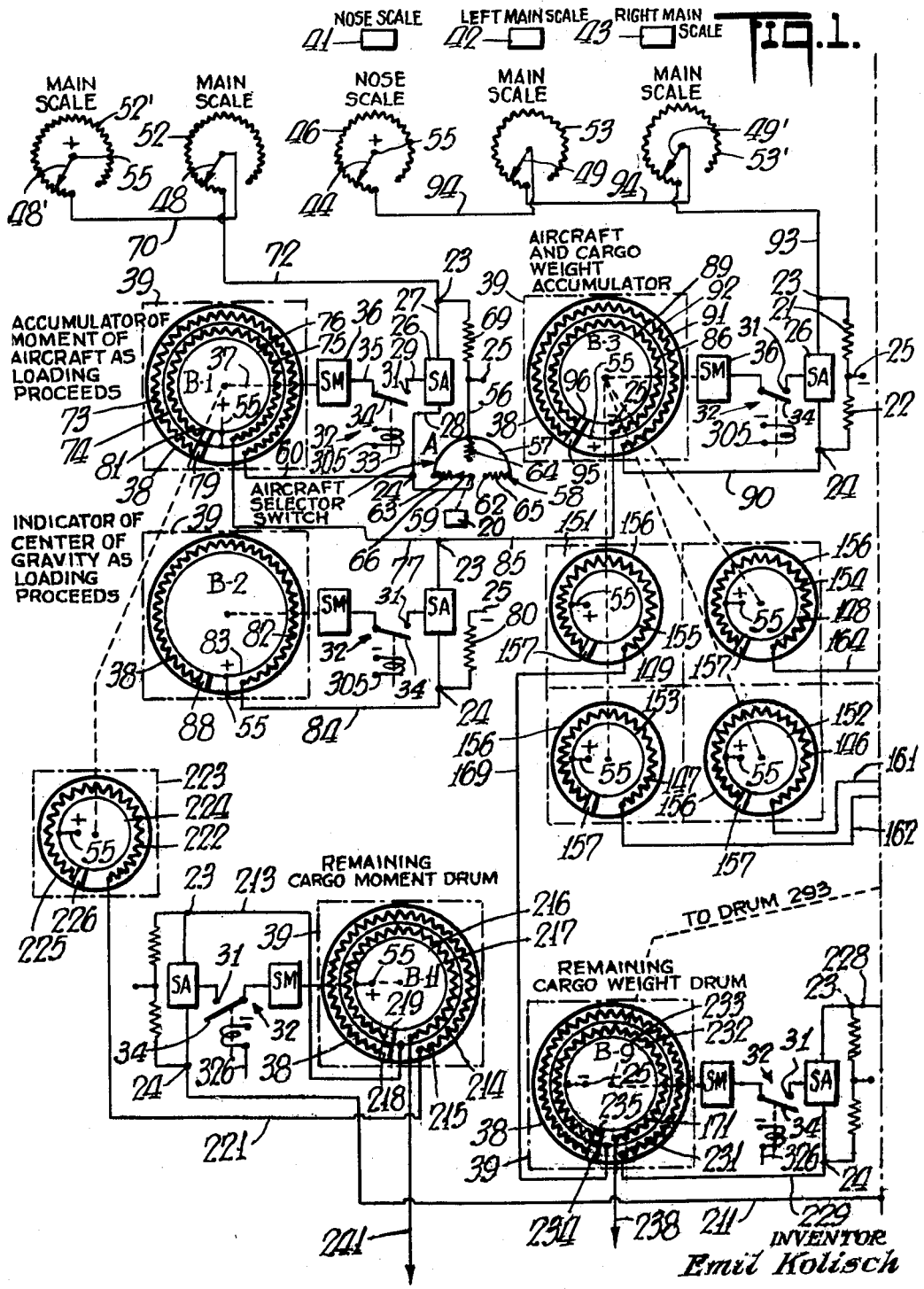
INVENTOR
Emil Kolisch
BY Dean Fairbank Hirsch
ATTORNEYS

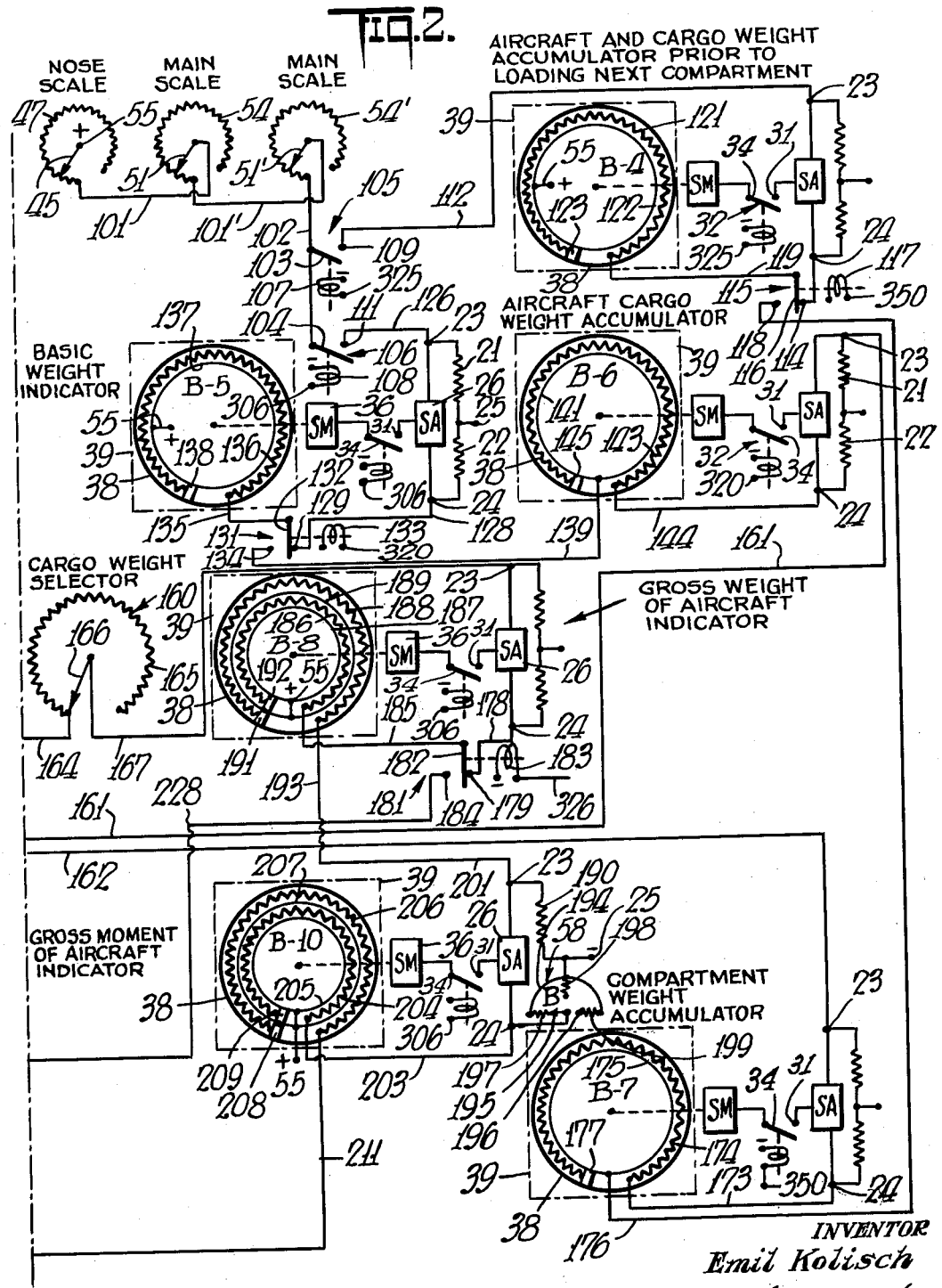

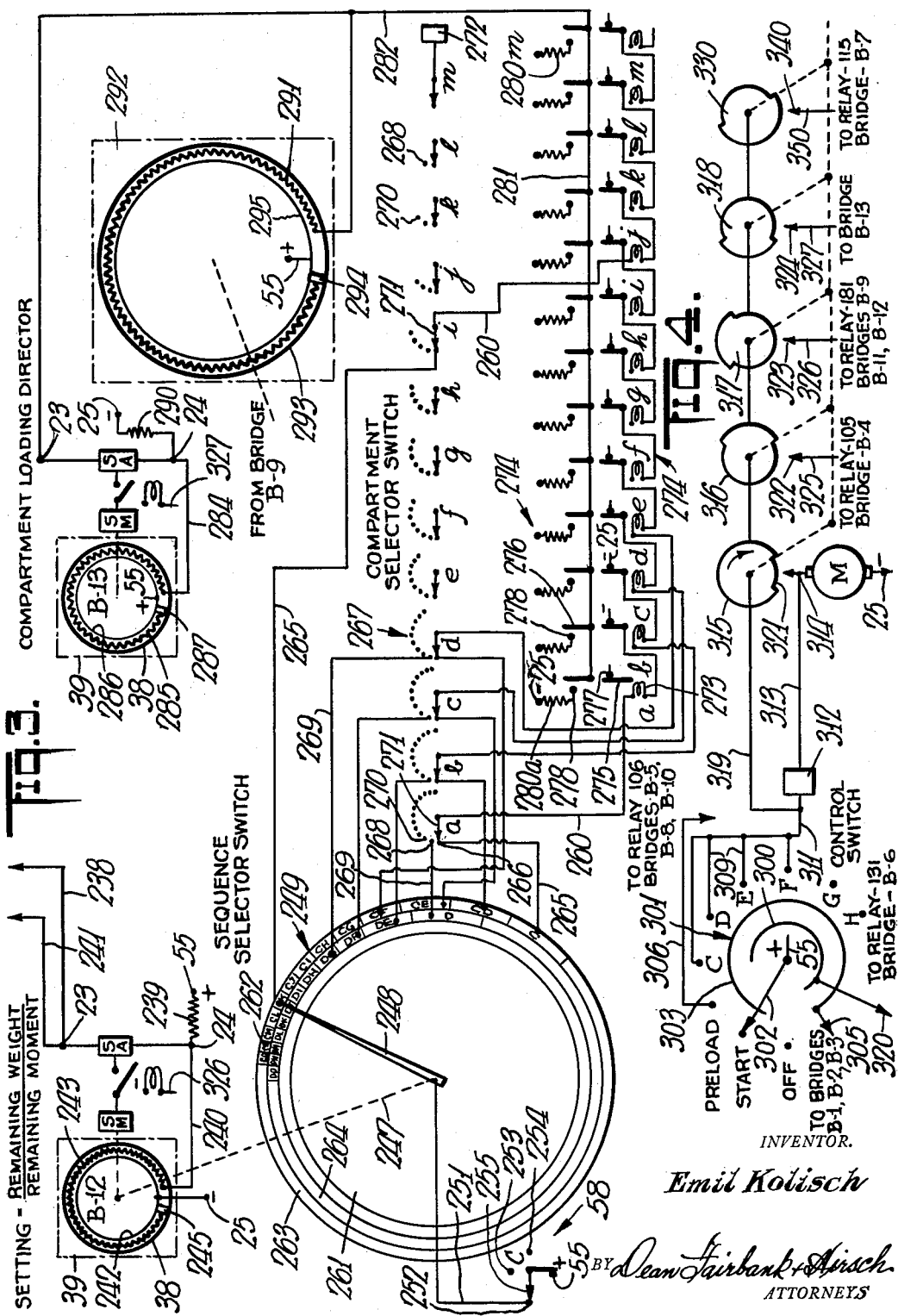

Nov. 29, 1955 E. KOLISCH 2,725,193
COMPUTING EQUIPMENT FOR LOADING CARGO AIRCRAFT
Filed Sept. 11, 1953 5 Sheets-Sheet 4
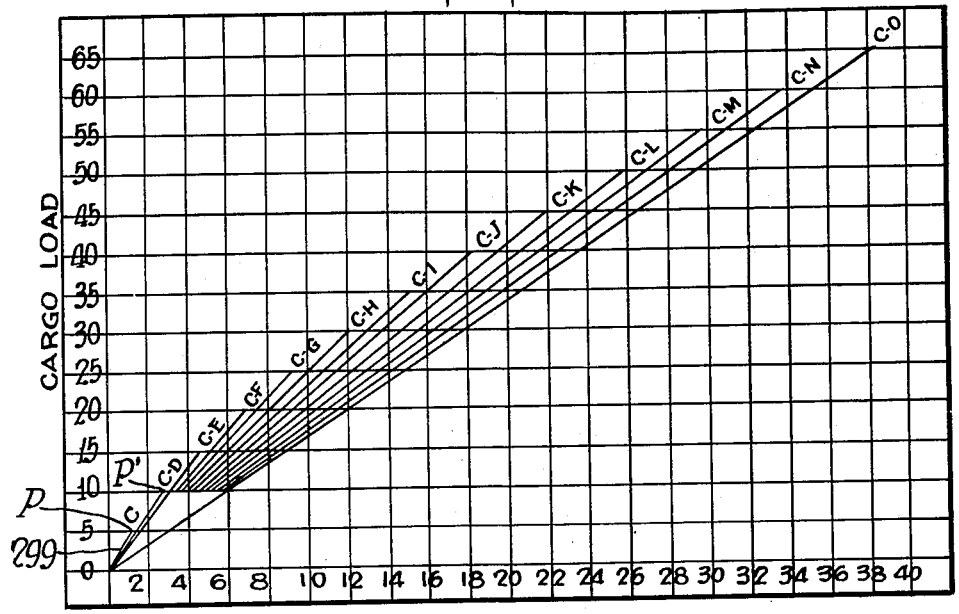
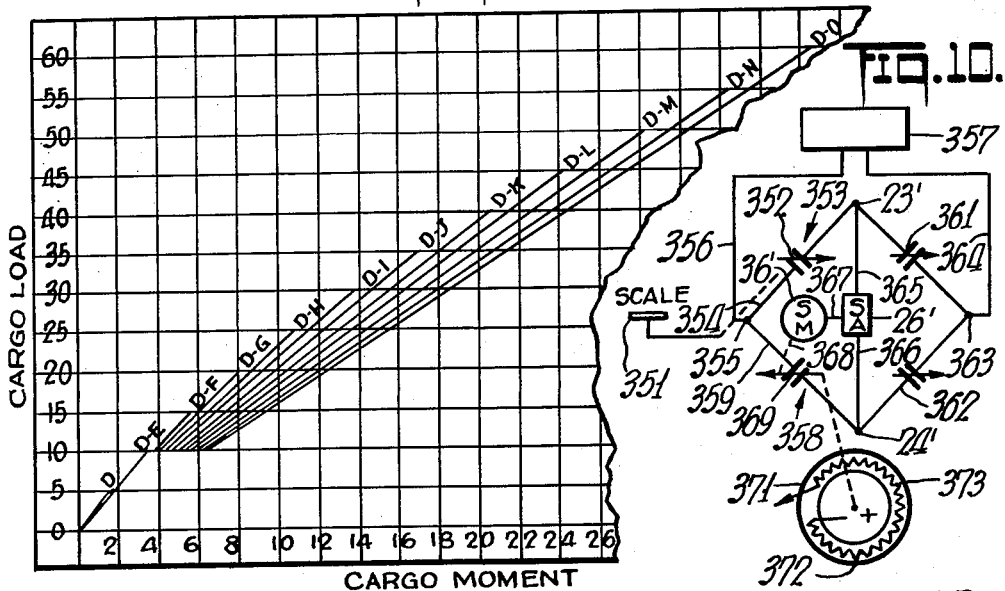
INVENTOR
*Emil Kolisch*
BY *Dean Fairbank & Hirsch*
ATTORNEYS Nov. 29, 1955  E. KOLISCH  2,725,193
COMPUTING EQUIPMENT FOR LOADING CARGO AIRCRAFT
Filed Sept. 11, 1953  5 Sheets-Sheet 5
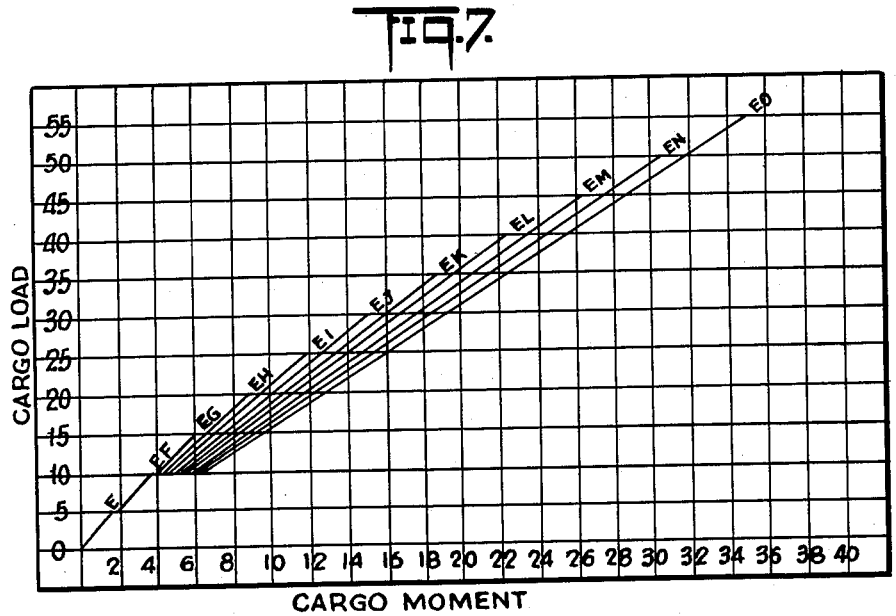
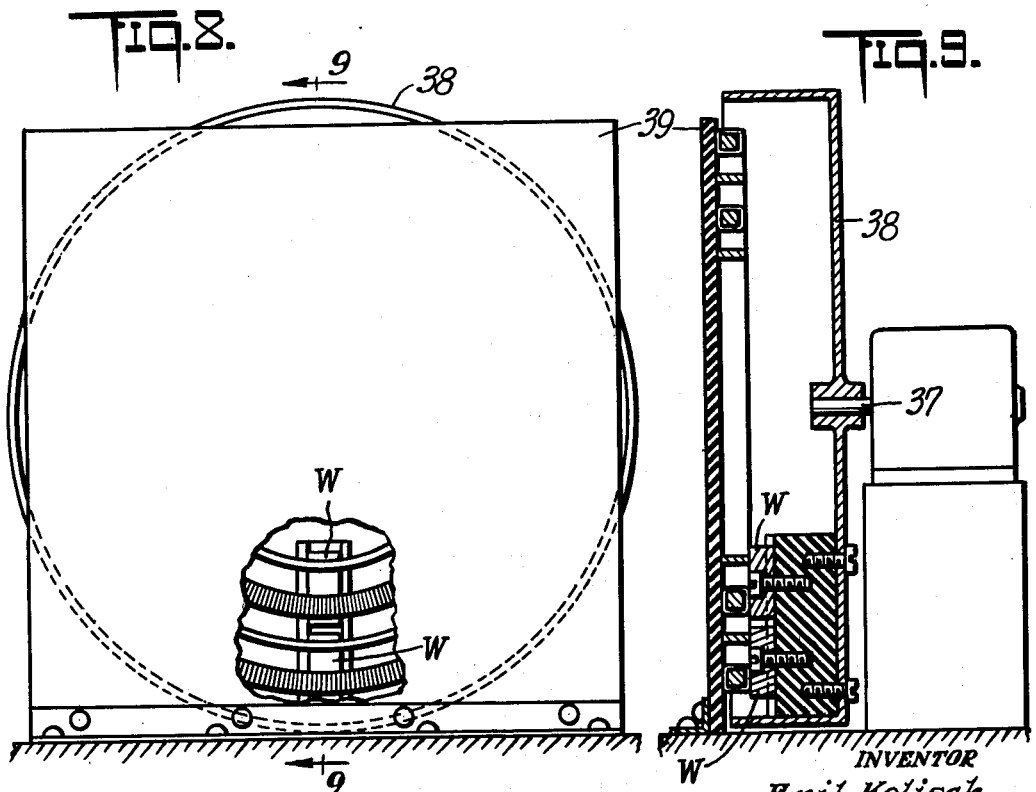
INVENTOR
Emil Kolisch
BY Dean Fairbank & Hirsch
ATTORNEYS

United States Patent Office 2,725,193
Patented Nov. 29, 1955

2,725,193

COMPUTING EQUIPMENT FOR LOADING CARGO AIRCRAFT

Emil Kolisch, New York, N. Y., assignor to Continental Silver Co. Inc., a corporation of New York Application September 11, 1953, Serial No. 379,710

17 Claims. (Cl. 235—61)

For an aircraft to take off, fly and land safely, its center of gravity along the length of the aircraft must be at some predetermined location which may vary between certain definite fixed limits.

These permissible fixed limits are determined by the manufacturer of the aircraft, ordinarily by flight tests, and are generally expressed as a percentage of the mean aerodynamic chord, which is commonly known as and is therefore hereinafter designated "MAC". The MAC of an aircraft is described in textbooks as the chord of an air foil which is generally a definite segment between the leading and trailing edges of the wing.

The distance of the center of gravity of an aircraft from a fixed reference datum is equal to the total moment of such aircraft (empty, partly or fully loaded as the case may be), about such reference datum, divided by its total weight. Where the aircraft is of the type having a nose wheel and a pair of main wheels, the distance of the main wheels from the nose wheel along the length or longitudinal axis of the aircraft, multiplied by the total weight carried by such main wheels, is the moment of the aircraft about the nose wheel as the reference datum. Such moment divided by the total weight of the aircraft, that is, the sum of the weights on the main wheels and the nose wheel, determines the distance of the center of gravity from the nose wheel. Such calculation may be expressed for the aircraft at any stage of loading by the formula:

(1) $$C.G. = \frac{WMW \cdot D + \Sigma(wMW \cdot D)}{WMW + WNW + \Sigma(wMW + wNW)}$$

in which $C.G.$ = Distance of center of gravity from nose wheel of aircraft
$WMW$ = Portion of basic weight (weight of aircraft without cargo, but including crew, fuel, safety equipment and all standard equipment) carried by both main wheels
$WNW$ = Portion of basic weight carried by nose wheel
$D$ = Distance from nose wheel center to main wheel centers when projected upon the longitudinal axis of the aircraft.

The symbol $\Sigma$ designates sum. In the numerator the expression beginning with $\Sigma$ designates the sum of the products of the portion of cargo weight $w$ resting on the main wheels, due to cargo $w_1$, $w_2$, $w_3$, etc. loaded into the respective compartments of the aircraft, multiplied by the distance $D$. In the denominator the expressions beginning with $\Sigma$ designate respectively the sum of the portions of weight due to the cargo weight ($w_1$, $w_2$, $w_3$, etc.) resting respectively upon the main wheels and the nose wheel. The above formula serves to determine the position of the center of gravity of the aircraft for all stages or degrees of loading.

An index number easily derived from the center of gravity of the aircraft, as above determined, may be defined by the formula:

(2) Index number =
$k$ weight × (CG minus reference datum constant)

in which

Weight = Accumulated weight of the aircraft
Reference datum constant = Distance from center of nose wheel to a fixed point which may be, for instance, the leading edge of the wing.
$k$ = An arbitrary reduction constant to bring the number into the desired range.

To illustrate the two formulas above mentioned, let it be assumed that the main wheels of the aircraft are 437 inches from the nose wheel; that the basic weight of the aircraft (i. e., entire weight less cargo) is 86,000 pounds of which 76,020 pounds are carried by the main wheels and 9,980 pounds by the nose wheel. In the Formula 1 for center of gravity for the aircraft without cargo we find:

$$CG \text{ in inches} = \frac{76,020 \times 437}{76,020 + 9,980} = 386 \text{ inches}$$

To determine the index number of the same aircraft, when the reference datum constant is selected as the distance of the leading edge of the wing from the nose wheel, illustratively 368 inches, with the reduction factor $k = .00001$, the Formula 2 for index number becomes:

Index number = $.00001 \times 86,000 \, (386-368) = 15.48$

The center of gravity of an aircraft with respect to any given reference datum may also be expressed in terms of percent MAC which is the ratio of the distance of the center of gravity from the leading edge of the MAC to the length of the MAC multiplied by 100.

The percent MAC may be determined by using the formula:

(3) $$\text{Percent MAC} = \frac{100(H-Y)}{C}$$

in which $H$ = Distance from reference datum to CG
$Y$ = Distance from reference datum to leading edge of MAC
$C$ = length of MAC Assuming that the aircraft above discussed has an MAC 154 inches in length and the permissible limits of the CG are between 390 and 420 inches from the nose wheel, the percent MAC for the forward limit is determined by Formula 3 as follows:

$$\text{Percent MAC} = \frac{390 - 368}{154} \times 100 = 14.3$$

and for the rearward limit as follows:

$$\text{Percent MAC} = \frac{420 - 368}{154} \times 100 = 33.8$$

By reason of the preponderantly forward position of equipment, fuel and crew, the center of gravity of the aircraft loaded with all but cargo is often, as in the present example (where it is 386 inches) outside of the foregoing permissible limits of the MAC. But for the loaded aircraft the center of gravity must be within such limits for safety in take-off, flight and landing.

Assuming that the aircraft, which without cargo has the center of gravity and index number above determined, is now partly loaded with a weight of 2,222 pounds, only a portion of which is carried by the main wheels, i. e., 1,283.9 pounds, the center of gravity of which added weight is at a point say, 252.5 inches from the nose wheel, the center of gravity of the aircraft as thus partly loaded is calculated from Formula 1 as follows:

$$CG = \frac{76{,}020 \times 437 - 1{,}283.9 \times 437}{76{,}020 + 9{,}980 - (1{,}283.9 + 938.1)} = 382.9$$

The corresponding index number is calculated from Formula 2 as follows:

*Index number* $= .00001 \times 88{,}222 \times (382.9 - 368) = 13.15$

According to one present practice, the unloaded weight of an aircraft, i. e., without crew, fuel, safety equipment or cargo, but including all standard equipment, is determined generally by actually weighing the aircraft on suitable weighing kits. For travel to a given destination, requiring a given crew, fuel load, and safety equipment, the Weights & Balances Division notes the weights of such crew, fuel and safety equipment on a suitable form, adds such weights to the weight of the aircraft, empty but for its standard equipment and subtracts the sum from the gross take-off weight which is predetermined, leaving a value for the payload weight or allowable cabin load that may be carried to a given destination.

In practice, that cargo is then loaded under the direction of a Cargo Loading Supervisor into the aircraft which may be of the type marked off into compartments along its length. The cargo to be loaded must be so distributed into the various compartments, that the center of gravity of the fully loaded aircraft will fall within the permissible limits of the MAC of the aircraft, i. e. between 14.3 and 33.8 percent in the illustrative example herein given and preferably approximately midway therebetween, i. e. say 405 inches from the nose wheel for an MAC of 24 percent.

The compartments are then loaded in sequence, the weights placed in each compartment being noted on a manifest. These weights are generally copied from the values marked upon the units of cargo by the shipper or manufacturer.

Although certain ideal weights in the respective compartments would secure the optimum or desired center of gravity of the fully loaded aircraft, the units of cargo to be shipped generally do not admit of such loading, so that such ideal loading of the respective compartments cannot be thus simply attained.

After the aircraft has been completely loaded, the manifest showing the weights loaded in the respective compartments goes to the Weights & Balances Division of the airport. This division, according to one present practice, starting with a slide-rule setting representing the index number of the unloaded aircraft plus the settings for the weight of fuel, crew and safety equipment which is loaded into the aircraft, introduces into such setting which represents the basic center of gravity of the aircraft, additional values of the cargo weight in successive compartments, the index number of course shifting as the weight of each loaded compartment is introduced into the slide-rule setting. Should the final index number thus shown on the slide-rule correspond to a center of gravity outside of safe limits or as otherwise defined, outside the permissible limits of the percent MAC, the loading supervisor will be advised that the cargo must be shifted. Thus, if the aircraft is tail-heavy, the high index number will indicate that cargo must be shifted out of the tail and moved forward and similarly, if the aircraft is nose-heavy the low index number will indicate that cargo must be shifted from the nose toward the rear of the aircraft.

The cargo as thus shifted must of course again be checked with the aid of the slide-rule and further shifted if the aircraft is not yet so loaded as to come within the permissible limits of percent MAC.

The personnel of the Weights & Balances Division must be highly trained to perform the duties above outlined. Since error in calculations and slide-rule settings might have fatal consequences, it becomes necessary, despite the care exercised by the loading personnel, that the calculations of the Weights & Balances Division must be carefully checked and rechecked and even with such checking, by reason of the human element involved, there is no assurance that serious error has not remained undetected.

As the distribution of the cargo load is essentially a matter of guess work, frequent shifting of cargo may be required, however skilled the cargo loading supervisor, in order to correct inevitable errors in loading. This is a very time consuming and arduous procedure, by reason of the difficulty of manipulating heavy and bulky items of cargo within the limited confines of the aircraft.

In addition, each time the cargo is shifted, new calculations must be made on the slide-rule to check for correctness of new distribution.

As a result of the foregoing, the take-off of the aircraft will be delayed with consequent loss of efficiency due to reduction of flying time with consequent piling up of cargo in a warehouse or need for additional aircraft due to underloading.

Inasmuch as the subsequent settings of the slide-rule to determine the center of gravity of the loaded aircraft depend upon the accuracy of the index number determination of the unloaded aircraft, if any items of equipment should be added to or removed from the aircraft without appropriate entry and compensation for its magnitude and location, then no matter how accurately the subsequent settings of the slide-rule are made for the center of gravity determination with respect to crew members, fuel, safety equipment and cargo, such slide-rule determined center of gravity of the aircraft as about to take-off, may differ materially from its actual center of gravity.

Even if all items added to or removed from the aircraft are properly listed and compensated for, the slide-rule determined center of gravity of the aircraft may in fact not be its actual center of gravity because of factors such as previously alluded to at the time of take-off.

Thus, for example, the residue in the crevices of the aircraft of a previous bulk cargo such as grain, especially such residue near the tail end, may add such moment that the slide-rule determined center of gravity may be within the permissible limits of the MAC, while the actual center of gravity may in fact be outside such limits.

Furthermore, it is possible that the weights of the items of cargo used in the calculations were incorrectly marked by the supplier and though correctly transcribed may cause the actual center of gravity at take-off to differ materially from the slide-rule determined center of gravity.

Even if the weights on the items are correct and all calculations and slide-rule settings are also correct, as the slide-rule setting is based upon an even distribution of cargo over the entire compartment which is rarely, if ever, found, the resultant slide-rule determined or calculated final center of gravity may deviate radically from the true final center of gravity.

As a result of such errors, there may be uneconomical fuel consumption or the aircraft may be dangerously tail-heavy or nose-heavy with resultant possibility of crash on take-off or on landing.

The training of cargo loading supervisors is slow and costly at best and especially so where actual cargo aircraft of various loading characteristics that can ill be spared are kept out of flying service so that they may be more or less by trial and error loaded for training, instruction or practice purposes, checked with the aid of a slide-rule and the loads repositioned until correct loading has finally been achieved.

Where it is attempted to load a given cargo weight with the aid of charts in order to determine distribution among the various compartments of the aircraft for a final desired center of gravity, since it is not possible or feasible in most cases to load into the aircraft weight that comes particularly close to that which is indicated on the charts, the charts might be of little use as a guide for distribution of cargo for desired center of gravity.

It is accordingly among the objects of the invention to provide an equipment by which, with but few manipulations, the distribution of any given payload into all or less than all the respective compartments of any given aircraft, depending upon circumstances, may readily be ascertained beforehand even by an unskilled person in order to attain desired loading.

Another object is to provide an equipment which may readily be operated by even an unskilled person without need for mental or manual calculations or manipulations or charts of any sort or the possibility of human error, reliably to assure that the actual center of gravity of the aircraft as about to take-off is within the permissible limits set by the manufacturer for safety in take-off, flight and landing, and more particularly, automatically to take into account the actual weight of the loaded aircraft and the actual position of its contents, without error due to incorrect entries on a manifest, of weight or position, as for instance due to correctly copying erroneous marking of weights on the items of cargo loaded into the aircraft, failure to compensate for the addition or withdrawal from the aircraft of items of equipment, or the accumulation of dust or cargo residues.

Another object is to provide an equipment with which students may be instructed without tying up for the purpose actual cargo aircraft, as to proper predetermination of the distribution of cargoes of various types and weights into various compartments of various types of aircraft, so that the center of gravity of the loaded aircraft will assuredly be within the permissible limits of MAC, without the need for shifting of cargo of the aircraft to correct for errors where this loading is effected by guess or estimate.

Another object is to provide an equipment with which proper predetermination may be made of the distribution of cargoes of various types and weights into various compartments of various types of aircraft with assurance that the center of gravity of the aircraft when loaded in accordance with such predetermination will be within the permissible limits of MAC, without the need for shifting of cargo on the aircraft to correct for errors.

Another object is to provide an equipment which directs the safe and efficient loading of any total cargo to be carried, whether that cargo be relatively light or near the full carrying capacity of the aircraft, and will automatically indicate the ideal weight to be placed into each of a minimum number of compartments so that such cargo can be lashed in place in the aircraft most expeditiously, yet with assurance that when the aircraft has been loaded with the intended cargo, its center of gravity is between safe limits of MAC.

Another object is to provide an equipment to redetermine automatically, load distribution in remaining compartments in the event a previous compartment is not loaded with the predetermined weight, as may occur, for example, when an unusually heavy or unbalanced item of cargo is loaded into such compartment or when it extends beyond the compartment or over a number of compartments so that the center of gravity of the aircraft when remaining compartments are loaded in accordance with said redetermined weight distribution will be at a predetermined position of the MAC.

From its broader aspects, the invention affords facilities for determining (a) the basic weight of the aircraft (that is, weight with crew, safety equipment, fuel and standard equipment, but without cargo), and for setting up the cargo weight or allowable cabin load to be carried; (b) the predetermined gross weight (i. e., basic weight plus allowable cabin load); (c) the moment of the predetermined gross weight about a fixed reference datum, preferably the nose wheel center based upon a desired final position of center of gravity; (d) the remaining weight at each stage of the loading (that is, the difference between the predetermined gross weight and the sum of the basic weight plus the accumulated cargo weight) and (e) the remaining moment, that is, the difference between predetermined gross moment and the accumulated moment, that is, moment of basic weight plus accumulated cargo weight with respect to the fixed reference datum.

The number and location of consecutive compartments into which the allowable cabin load is to be distributed for desired center of gravity of the aircraft as about to take off, is ascertained by facilities, according to the invention, which include a compartment group selector controlled from the remaining weight and the remaining moment upon both of which factors the indicated loading uniquely depends and a compartment loading director controlled by the compartment group selector.

According to the invention from a more specific aspect, the setting of the compartment group selector is determined as a mathematical function of the remaining weight, and remaining moment, preferably as the ratio thereof.

The compartment loading director indicates the weight to be loaded into the first compartment of a sequence. If the exact weight shown by the compartment loading director were loaded into each compartment of such sequence until the full cargo weight had been loaded, the invention would accomplish the desired distribution of a given cargo. Since in practice it is however rarely, if ever, possible or feasible to load into any compartment of an aircraft the exact weight or proper distribution of such weight indicated in the manner referred to, the invention according to another feature affords facilities for automatically redetermining the weight to be put into subsequent compartments to be loaded, in manner that compensates for any excess or deficiency (within limits) of weight put into the previously loaded compartment or compartments and also for unequal distribution of such weight.

According to the invention, the re-determination or re-calculation to compensate for excess or deficiency in the weight of cargo previously loaded in one or more compartments is effected in order to ascertain the weight distribution in the further compartments to be loaded by determining the remaining weight and the remaining moment after such previous loading and utilizing such data in the same manner above set forth.

To determine the remaining weight or the remaining moment as the case may be, the invention utilizes an accumulator in which is introduced the accumulated total weight of the aircraft as the loading progresses, which weight is automatically subtracted from the predetermined gross weight to give the remaining weight. Similarly, the invention utilizes another accumulator in which is introduced the accumulated total moment as the loading progresses, which moment is automatically subtracted from the predetermined gross moment to give the remaining moment.

The various operations of addition and subtraction and of multiplication to determine moment as the product of weight and distance and of division to determine the ratio of weight to moment for controlling the compartment loading director, are effected electrically in automatically carrying out the computations, each by a self-balancing bridge circuit, across which a servo-amplifier is connected to operate a servo-motor that balances the bridge.

While appropriate electronic means, including for instance, oscillators and impedances, may be used for the purpose, there is illustratively shown in the drawings an arrangement of resistors for each bridge as well as alternatively a circuit in which impedances such as capacitors are used for the purpose.

While any known or predetermined weight could be set up in the equipment by manually operated or controlled switches or contacts cutting in impedances or in the specific embodiment shown, resistors of corresponding value, there is shown a preferred arrangement for cutting in such impedances or resistors in response to the operation of weighing scales on which the wheels of the aircraft rest. Such impedances or resistors are set up in bridges to give the basic weight of the aircraft and by setting up for addition thereto the total cargo to be carried, the predetermined gross weight is determined. Likewise, such weighing-scale-actuated impedances or resistors respond to the weight of the aircraft as it is being progressively loaded, to give the accumulated combined aircraft and cargo weight. These various factors thus controlled from the weighing scales are translated into the corresponding moments by automatically multiplying in the manner hereinafter set forth, each weight or increment of weight by the appropriate distance.

According to the invention, a multi-contact unit is provided to control the compartment loading director according to the ratio of remaining weight and remaining moment by putting in circuit one of its contacts which uniquely determines the number and position of consecutive compartments to be loaded when the equipment is set to the first compartment of such sequence. The contact thus put into circuit automatically and selectively places in circuit one of a plurality of multiplier resistors which controls a variable resistor, the contact arm of which is controlled from the remaining cargo weight to give the desired loading direction.

The multiplicity of contacts of the control unit correspond to the various possible sequences of compartments from a single one to the total number of compartments, among which the cargo or remaining cargo, as the case may be, could be distributed and contact means controlled by the ratio of remaining weight and remaining moment, registers with those contacts which correspond to each of various possible sequences of compartments, differing in number, among which the remaining cargo might alternatively be safely loaded.

Preferably the contacts of the control unit are arranged in a plurality of rows, in the illustrative embodiment shown, in a plurality of concentric arcuate rows of contacts on a disc, the contacts on each row being for all those sequences which begin with a given compartment to be loaded; thus the sequences of successive rows begin respectively with compartment C, D, E, etc. The contact means of the unit is an arm, a radial arm in the disc embodiment shown, which sweeps over all of the concentric rows of contacts and so would in any position engage the contacts on one or more of the rows as the case may be, so that, depending upon the manual setting of a control switch for any compartment, the contact on the particular row that starts with such compartment would be placed in circuit to select that corresponding multiplier resistor above referred to which is to control the compartment loading director.

The multiplier resistors which directly control the variable resistor to effect the setting of the compartment loading director are of different values, such that, depending upon the portion of the variable resistor selected by the setting of the remaining cargo weight, the compartment loading director will indicate a value corresponding to such weight divided by the number of compartments in the sequence corresponding to the selected contact of the control unit.

A control switch in its "start" or first operative position puts into circuit the bridge that determines the moment of the aircraft at any instant and also the bridge that determines the weight of the aircraft at any instant. The control switch when thereupon set in its second or "preload" position closes circuits to determine the gross weight and the gross moment which the aircraft would have when carrying the selected cargo load, and also to determine the basic weight in response to the operation of the weighing scales on which the aircraft was initially put prior to loading of cargo.

Thereupon the control switch is set to the first compartment to be loaded, illustratively compartment "C," and after that compartment has actually been loaded, the control switch is shifted to the next compartment position, compartment "D," and thus for each of the consecutive compartments. In all compartment selector positions of the control switch, the indicator for basic weight, predetermined gross weight and predetermined gross moment are and remain cut out of circuit and are maintained in their respective set positions throughout the loading. In all compartment selector positions of the control switch, the indicator for accumulated cargo weight of the aircraft is cut into and remains in circuit throughout the loading.

A cycle of operations, desirably controlled by an electric motor, performs the various steps leading to the ultimate setting of the compartment loading director, for each compartment setting of the control switch. That cycle includes the following sequence of steps, (a) placing into circuit the accumulator for the weight of any cargo previously loaded into the aircraft, (b) setting the remaining cargo weight, the remaining cargo moment and the ratio therebetween, (c) placing into circuit the cargo loading director and (d) placing into circuit the compartment weight accumulator.

The compartment weight accumulator is cleared only when the control switch is moved to the position of compartment next to be loaded, whereupon the previously described cycle is repeated for determining the setting of the compartment loading director for the next compartment.

While the position of the center of gravity as the loading proceeds is information not needed for loading according to the present invention, the position of the center of gravity may serve to corroborate correctness of the final loading and is readily and automatically determined as the quotient of the moment, divided by the weight of the aircraft at any instant.

While a separate and distinct equipment according to the present invention could be provided for each model or type of aircraft to be loaded, the invention affords facilities for readily using one and the same fundamental piece of equipment for any of a wide variety of different aircraft. To this end there is an aircraft selector switch, the setting of which determines the value of electric response, such as that effected by impedance or resistance as the case may be, corresponding to the respective distances to be incorporated in the respective moments, such as for instance, the distance between center of main wheel and nose wheel or the distance between desired center of gravity and nose wheel. Alternatively, different multi-contact control units would be used, selectively to be placed in operation, depending upon the particular construction and loading characteristics of the type of aircraft to be loaded.

By resort to the equipment of the present invention, aircraft may be efficiently and safely loaded without the need for trial and error.

The invention as hereinabove referred to, may be used in the airport in direct association with the aircraft to be loaded. Alternatively, the invention may, of course, be utilized in connection with a scale model aircraft using correspondingly small weighing scales, together with scale model weights for purposes of instruction and training of aircraft loading personnel. Such scale model aircraft and weights may be used in solving problems of logistics, by facilitating ascertainment of optimum loading of the corresponding full scale aircraft.

This application is a continuation-in-part of copending applications Serial No. 362,629, filed June 18, 1953, now Patent No. 2,686,426, issued August 17, 1954; Serial No. 303,450, filed August 8, 1952; Serial No.

273,493, filed February 26, 1952, now Patent No. 2,686,634, issued August 17, 1954.

In the accompanying drawings in which are shown one or more of various possible embodiments of the several features of the invention, Figs. 1, 2, 3 and 4 are circuit diagrams of various elements of the equipment, Figs. 5, 6 and 7 are charts for determining the set-up of the equipment for the compartment loading director, Fig. 8 is a front elevational view with parts broken away of a typical supporting panel, Fig. 9 is a longitudinal sectional view taken along line 9—9 of Fig. 8 of a typical drum and drive motor, and Fig. 10 is a circuit diagram of another embodiment of the bridge used in the equipment.

To facilitate understanding of the invention, it will be first described as applied to the loading of the compartments of one type of cargo aircraft which has two main wheels and a third wheel such as a nose wheel and the more general application of the invention will become evident as the description proceeds.

Referring now to the drawings, in the equipment shown, a single moment is utilized to determine the center of gravity, i. e., the moment of the weight on the main wheels with respect to a given reference datum, illustratively the nose wheel of the aircraft.

The equipment shown utilizes a plurality of substantially identical self-balancing instrumentalities such as Wheatstone bridge circuits, illustratively thirteen in number designated B–1 to B–13 respectively, each having a servo-amplifier 26 connected by input leads 27 and 28 respectively, to points 23 and 24 of each bridge. Each servo-amplifier 26 is connected by lead 29 to fixed contact 31 of a relay 32, which has a coil 33 to actuate its movable arm 34, which is normally spaced from fixed contact 31 when the coil 33 is not energized, and is connected by lead 35 to a servo-motor 36.

The servo-motor and servo-amplifier are illustratively of the type put out by the Brown Instrument Division of the Minneapolis-Honeywell Regulator Company, under the designation, Brown Electronik (continuous balance) Unit No. 354,574 and will not be further described.

The servo-motor 36 may be operatively connected by means of a shaft 37 to a rotatable member, desirably a drum 38 (Fig. 9) which is of light weight and which carries wiper means W thereon to contact resistors and conducting rings affixed on an associated immovable insulating panel 39, so that, depending upon the position of the drum and the wiper means, a predetermined amount of resistance may be placed in circuit.

It is of course to be understood that the elements above described are merely to illustrate the invention and conventional variable resistors could be used in place of the drum 38, the panel 39, the wiper means W and the resistance and conducting rings on panel 39.

Of the thirteen bridges utilized, eight (i. e. bridges B–3, B–4, B–5, B–6, B–7, B–8, B–9 and B–11) each desirably has a pair of resistors 21 and 22 in adjacent arms connected at one end respectively to points 23, 24, the other ends of said resistors 21, 22 being connected to negative main 25.

The equipment desirably comprises a plurality of weighing scales of any suitable type, illustratively three in number designated by the numerals 41, 42 and 43 to measure the weight on the nose wheel and the two main wheels respectively. In the illustrative embodiment herein shown in Figs. 1 and 2, the nose wheel scale controls a set of two movable contact arms 44 and 45, which coact with associated resistors 46 and 47, respectively; the main wheel scale 42 controls a set of three movable contact arms 48, 49 and 51 which coact with associated resistors 52, 53 and 54 respectively and main wheel scale 43 controls a set of three movable contact arms 48', 49' and 51' which coact with associated resistors 52', 53' and 54' respectively, said contact arms placing in circuit that portion of the associated resistor related to the value of the weight being measured. The arms 44, 45 and 48' of the scales are connected to positive main 55.

Section A of an aircraft selector switch 58 has an arm 59 movable by control knob 20 selectively to place in circuit in bridge B–1, which determines the moment of the aircraft as the loading proceeds, any of a plurality of resistors, three of which are illustratively shown and designated 63, 64 and 65, connected respectively at one end to the corresponding contact 62 and at the other end to common main 57, which is connected by lead 56 to negative main 25.

Movable arm 59 of switch 58 is connected by lead 66 to point 24 of bridge B–1. Point 23 of bridge B–1 is connected by lead 72 to one end of resistor 52, the associated arm 48 being connected by lead 70 to one end of resistor 52' and a fixed resistor 69 is connected at one end to point 23 and at its other end to negative main 25. Point 24 of bridge B–1 is connected by lead 60 to one end of resistor 73, desirably a continuous length of wire mounted on the insulating supporting panel 39 associated with bridge B–1, said resistor 73 desirably being arranged as an annulus. Also mounted on panel 39 of bridge B–1 is a conducting ring 74, a second annular resistor 75 and a second conducting ring 76. The conducting rings 74 and 76 are both desirably connected to positive main 55 and one end of resistor 75 is connected by lead 77 to point 23 of bridge B–2 which registers the center gravity.

The drum associated with moment bridge B–1 mounts a pair of spaced wiper arms 79 and 81, insulated from each other and designed to contact resistor 73, conducting ring 74 and resistor 75, conducting ring 76 respectively.

Mounted on panel 39 of center of gravity bridge B–2 is an annular resistor 82 and a conducting ring 83 connected to positive main 55. One end of resistor 82 is connected by lead 84 to point 24 of bridge B–2, a fixed resistor 80 being connected at one end to point 24 and at its other end to negative main 25. Point 23 is also connected by lead 85 to annular resistor 86 mounted on insulating panel 39 of bridge B–3 which determines the accumulated total weight of aircraft and cargo. The drum 38 associated with center of gravity bridge B–2 desirably has its periphery calibrated in increments of inches and mounts a wiper arm 88 designed to contact resistor 82 and conducting ring 83.

Also mounted on panel 39 of bridge B–3 is a conducting ring 89 connected to negative main 25, a second annular resistor 91 and a conducting ring 92, which is connected to positive main 55. One end of resistor 91 is connected by lead 90 to point 24 of bridge B–3. Point 23 of bridge B–3 is connected by lead 93 to one end of scale resistor 53'; the movable arm 49' associated with resistor 53' is connected by lead 94' to one end of scale resistor 53 and the movable arm 49 associated with resistor 53 is connected by lead 94 to one end of scale resistor 46.

The drum 38 associated with total weight accumulator bridge B–3 desirably mounts a pair of spaced wiper arms 95 and 96 insulated from each other and designed to contact resistor 91, conducting ring 92 and resistor 86, conducting ring 89 respectively.

One end of scale resistor 47 is connected by lead 101 to movable arm 51 associated with scale resistor 54; one end of resistor 54 is connected by lead 101' to movable arm 51' associated with scale resistor 54' and one end of said resistor 54' is connected by lead 102 to movable contact arms 103, 104 of relays 105 and 106 respectively. Each of relays 105 and 106 has a coil 107, 108 respectively, which when actuated, brings the corresponding contact arms 103, 104 that are normally spaced from their associated fixed contacts 109 and 111 respectively, to closed position.

Fixed contact 109 is connected by lead 112 to point 23 of bridge B–4 which determines the combined aircraft and accumulated cargo weight prior to the loading of a compartment. Point 24 of bridge B–4 is connected to fixed contact 114 of a relay 115, the latter having a movable contact arm 116 normally engaging said fixed contact 114 when the coil 117 of the relay is not energized, and being spaced from fixed contact 118.

Contact arm 116 is connected by lead 119 to one end of annular resistor 121 mounted on insulating panel 39 of bridge B–4. Also mounted on panel 39 is an annular conducting ring 122 connected to positive main 55. The drum 38 associated with total weight accumulator bridge B–4 desirably mounts a wiper arm 123 designed to contact resistor 121 and conducting ring 122.

The fixed contact 111 of relay 106 is connected by lead 126 to point 23 of bridge B–5 which determines the basic weight of the aircraft. Point 24 of said bridge is connected by lead 128 to fixed contact 129 of relay 131, the latter having a movable contact arm 132 normally engaging said fixed contact 129 when the coil 133 of the relay is not energized and being spaced from fixed contact 134.

Contact arm 132 is connected by lead 135 to one end of annular resistor 136 mounted on insulating panel 39 of bridge B–5. Also mounted on panel 39 is an annular conducting ring 137 connected to positive main 55. The drum 38 associated with basic weight bridge B–5 desirably mounts a wiper arm 138 designed to contact resistor 136 and conducting ring 137.

The fixed contact 134 of relay 131 is connected by lead 139 to annular conducting ring 141 mounted on panel 39 of bridge B–6 which determines the cargo weight accumulated in the aircraft. Also mounted on panel 39 is an annular resistor 143, one end of which is connected by lead 144 to point 24 of bridge B–6. The drum 38 associated with cargo weight accumulator bridge B–6 desirably has its periphery calibrated in increments of weight and mounts a wiper arm 145 designed to contact resistor 143 and conducting ring 141.

Associated with bridge B–3 (Fig. 1) are a plurality of annular resistors 146, 147, 148 and 149 each being mounted on an associated immovable insulating panel 151, having a conducting ring 152, 153, 154 and 155 thereon, encompassed by the associated resistor and connected to positive main 55.

A plurality of drums 156 associated respectively with each of said panels are ganged to rotate in unison with the drum 38 of bridge B–3. Each drum 156 mounts a wiper arm 157 designed to contact the pairs of resistors and conducting rings 146, 152; 147, 153; 148, 154 and 149, 155 respectively.

One end of resistor 146 is connected by lead 161 to point 23 of bridge B–6. One end of resistor 147 is connected by lead 162 to point 23 of bridge B–7 which determines the weight accumulated in each compartment. One end of resistor 148 is connected by lead 164 to one end of annular resistor 165 of cargo weight selector switch 160, a rotatable contact arm 166 engaging said resistor 165 being connected by lead 167 to point 23 of bridge B–8 which determines the gross weight of the aircraft. One end of resistor 149 is connected by lead 169 to conducting ring 171 mounted on insulating panel 39 of bridge B–9 which determines the remaining cargo weight.

Point 24 of the bridge B–7 is connected by lead 173 to one end of annular resistor 174 mounted on insulating panel 39 of bridge B–7. Also mounted on panel 39 is an annular conducting ring 175 connected by lead 176 to fixed contact 118 of relay 115. The drum 38 associated with compartment weight accumulator bridge B–7 desirably has its periphery calibrated in increments of weight and mounts a wiper arm 177 designed to contact resistor 174 and conducting ring 175.

Point 24 of bridge B–8 is connected by lead 178 to fixed contact 179 of relay 181, normally engaged by its movable contact arm 182 when the relay coil 183 is not energized and being spaced from fixed contact 184. Contact arm 182 is connected by lead 185 to one end of annular resistor 186 mounted on insulating panel 39 of bridge B–8. Also mounted on panel 39 is an annular conducting ring 187, a second annular resistor 188 and a second conducting ring 189, said conducting rings being connected to positive main 55. The drum 38 associated with gross weight bridge B–8, desirably has its periphery calibrated in increments of weight and mounts a pair of spaced wiper arms 191 and 192 insulated from each other and designed to contact resistor 188, conducting ring 189 and resistor 186, conducting ring 187 respectively.

One end of resistor 188 is connected by lead 193 to point 23 of gross moment bridge B–10. A fixed resistor 190 has one end connected to point 23 and its other end to negative main 25. Point 24 is connected to movable contact arm 195 of section B of aircraft selector switch 58 ganged with arm 59 of section A, to be moved therewith by rotation of knob 20, selectively to engage any of a plurality of fixed contacts 196. Each of the contacts 196 is connected to a corresponding resistor, three of which are illustratively shown and designated 197, 198 and 199, all being connected through common main 194 to negative main 25.

Point 24 of bridge B–10 is also connected by lead 203 to one end of annular resistor 204 mounted on insulating panel 39 of said bridge B–10. Also mounted on panel 39 is an annular conducting ring 205, a second annular resistor 206 and a second conducting ring 207, said conducting rings being connected to positive main 55.

The drum 38 associated with gross moment bridge B–10 mounts a pair of spaced wiper arms 208 and 209 insulated from each other and designed to contact resistor 206, conducting ring 207 and resistor 204, conducting ring 205 respectively.

One end of resistor 206 is connected by lead 211 to point 24 of bridge B–11 which determines the remaining cargo moment. Point 23 of said bridge is connected by lead 213 to annular conducting ring 214 mounted on insulating panel 39 of said bridge B–11. Also mounted on panel 39 is an annular resistor 215, a second annular conducting ring 216 and a second annular resistor 217, conducting ring 216 being connected to positive main 55.

The drum 38 associated with remaining cargo moment bridge B–11 mounts a pair of spaced wiper arms 218 and 219 insulated from each other and designed to contact resistor 215, conducting ring 214 and resistor 217, conducting ring 216 respectively.

One end of resistor 215 is connected by lead 221 to one end of annular resistor 222 mounted on insulating panel 223. Also mounted on panel 223 is an annular conducting ring 224 connected to positive main 55. A drum 225 associated with panel 223 is ganged to rotate with drum 38 of bridge B–1 and mounts a wiper arm 226 designed to contact resistor 222 and conducting ring 224.

The fixed contact 184 of relay 181 (Fig. 2) is connected by lead 228 to point 23 of bridge B–9 which determines the remaining cargo weight. Point 24 of said bridge is connected by lead 229 to one end of annular resistor 231 also mounted on panel 39 of bridge B–9 and encompassing conducting ring 171. In addition, a second annular resistor 232 and a second conducting ring 233 are also mounted on panel 39, said conducting ring 233 being connected to negative main 25.

The drum 38 associated with remaining cargo weight bridge B–9 mounts a pair of spaced wiper arms 234 and 235 insulated from each other and designed to contact resistor 231, conducting ring 171 and resistor 232, conducting ring 233 respectively.

One end of each of resistors 217 and 232 of bridges B–11 and B–9 respectively is connected by leads 241 and 238 to point 23 of bridge B–12 (Fig. 3) which determines the ratio between the remaining weight and moment. A fixed resistor 239 is connected at one end to point 24 and its other end to positive main 55. Point 24 is also connected by lead 240 to one end of annular resistor 243, mounted on an insulating panel 39. Also mounted on panel 39 of bridge B–12 is an annular conducting ring 242, connected to negative main 25. The drum 38 associated with bridge B–12 mounts a wiper arm 245 designed to contact resistor 243 and conducting ring 242.

The drum 38 of bridge B–12 is connected by a shaft 247 to the rotatable contact arm 248 of a compartment sequence selector switch 249. The contact arm 248 is connected, as through a conventional slip ring contact (not shown), by lead 251 to fixed contact 252 of section C of aircraft selector switch 58. In addition to fixed contact 252, section C has two additional fixed contacts 253 and 254 which may be selectively engaged by switch arm 255 controlled by knob 20, said switch arm being connected to positive main 55. Each of the contacts 252, 253 and 254 is connected to the movable arm 248 of a corresponding separate and distinct selector switch 249, only one of which is shown in the drawings and will now be described in detail.

Selector switch 249 desirably comprises a panel 261 which has a plurality of concentric arcuate rows of contacts 262 thereon, insulated from each other, which may be engaged by selector arm 248. The number of rows of contacts depends upon the number of cargo carrying compartments in the particular aircraft involved and the number of contacts in each row decreases successively by one from the total number in the outermost row to the minimum number in the innermost row.

Thus, assuming the aircraft to be loaded has 13 compartments, the outermost row 263 will have 13 contacts, the next row 264, 12 contacts, and so on to the 13th row which has one contact.

The contacts on row 263 which are designated C, C–D, C–E, etc. to C–O, are connected respectively by leads 265 to fixed contact 266 of each of the thirteen sections a to m of a compartment selector switch 267. Each of the first twelve sections a to l of switch 267 desirably has an additional fixed contact 268, said twelve contacts 268 being connected respectively by leads 269 to the twelve contacts on row 264. Similarly, each of the first eleven sections a to k of switch 267 has an additional fixed contact 270, said eleven contacts 270 being connected respectively to the eleven contacts on the next row, and so on so that the first section of the switch 267 will have thirteen fixed contacts, the second twelve contacts and so on, the thirteenth section having one fixed contact.

Associated with each of the thirteen sections of switch 267 is a movable contact arm 271, said arms being ganged together to move in unison upon rotation of knob 272 and designed successively to engage the fixed contacts 266, 268, etc. Each of the movable contact arms 271 is connected by lead 260 to one end of the coil of an associated relay 273, thirteen relays a to m being provided in a relay bank 274. Each relay desirably has a pair of movable contact arms 275, 276 and a pair of fixed contacts 277, 278, the contacts 277 being normally connected to negative main 25. One end of the coil of relay 273a is connected to contact arm 275 of relay 273b; one end of the coil of relay 273b is connected to contact arm 275 of relay 273c and so on.

Each of the fixed contacts 278 of relay 273a to m is connected to one end of a resistor 280a to 280m respectively, the other ends of said resistors being connected to negative main 25.

The contact arms 276 of each of the relays 273a to 273m are connected to common main 281, which is connected by lead 282 to point 23 of the compartment loading director bridge B–13. Also connected to point 23 is one end of an annular resistor 291 mounted on an insulating panel 292. A drum 293 is associated with panel 292 and is ganged to rotate in unison with drum 38 of bridge B–9. Drum 293 mounts a wiper arm 294 designed to contact the resistor 291 on panel 292 as well as an annular conducting ring 295 also mounted on said panel and connected to positive main 55. Point 24 of said bridge B–13 is connected to one end of a fixed resistor 290, the other end of which is connected to negative main 25 and point 24 is also connected by lead 284 to one end of annular resistor 285 mounted on insulating panel 39 of said bridge. Also mounted on panel 39 is an annular conducting ring 286 connected to positive main 55. The drum 38 associated with compartment loading director bridge B–13 desirably has its periphery calibrated in increments of weight and mounts a wiper arm 287 designed to contact resistor 285 and conducting ring 286.

The circuit shown in Fig. 4 desirably controls the sequence of operation of the equipment above described.

This circuit desirably comprises a control switch 301 having a movable contact arm 302 connected to positive main 55 and a plurality of fixed contacts designated "off," "start," "pre-load," "compartment C, D, E, etc." which may be successively engaged by contact arm 302 as it is manually turned. The switch 301 also includes an arcuate conducting member 303 engaged by the arm 302 in all but "off" position of the switch and a second arcuate conducting member 300 which is engaged by the arm 302 in all positions of the switch except "off," "start" and "pre-load" positions.

The conducting member 303 is connected by lead 305 to one side of the coils 33 of relays 32 of bridges B–1, B–2 and B–3, the other sides of said coils being connected to negative main 25. The conducting member 300 is connected by lead 320 to one side of the coil 133 of relay 131 and to one side of the coil 33 of relay 32 of bridge B–6, the other side of said coils being connected to negative main 25.

The pre-load contact is connected by lead 306 to one side of the coil 108 of relay 106 and to one side of the coils 33 of relays 32 of bridges B–5, B–8 and B–10, the other side of said coils being connected to negative main 25.

The compartments C, D, E, etc. positions are connected by leads 309 to common main 311 which is connected to the input of time delay relay 312, the output of which is connected by lead 313 to wiper arm 314 which is also connected to one side of motor M, the other side of which is connected to negative main 25.

The motor M mounts a plurality of conducting discs 315, 316, 317, 318 and 330 connected by lead 319 to main 311. Each disc has a notch 321 in its periphery so that in the corresponding range of position of the discs 315, 316, 317, 318 and 330, the associated wiper arms 314, 322, 323, 324 and 340 will not engage the periphery of the associated disc.

As illustratively shown in Fig. 4, when the discs are rotated in clockwise direction, the periphery of discs 315 and 316 will engage their associated wiper arms at approximately the same time. The periphery of disc 316 will disengage its wiper arm 322 slightly after the periphery of disc 317 engages its wiper arm 323. The periphery of 318 and 330 will engage their associated wiper arms 324 and 340 slightly before the periphery of disc 317 disengages its wiper arm 323, and disc 318 will disengage its wiper arm 324 at approximately the same time as the periphery of disc 315 disengages its wiper arm 314 to cut off motor M. Even though motor M is cut off, the periphery of disc 330 will still engage its wiper arm 340 to complete the circuit from positive main 55 thereto, through arm 302 of switch 301.

The wiper arms 322, 323, 324 and 340 are connected respectively by leads 325, 326, 327 and 350 to one side of coil 107 of relay 105 and coil 33 of relay 32 of bridge B–4; to one side of coil 183 of relay 181 and coils 33 of relays 32 of bridges B–9, B–11 and B–12; to one side of the coil 33 of relay 32 of bridge B-13; and to one side of the coil 117 of relay 115 and to coil 33 of relay 32 of bridge B-7. The other sides of said coils are connected to negative main 25.

Determination of cargo load distribution

The particular compartments into which cargo is to be distributed for an optimum center of gravity, is determined by calculations illustrated in the charts shown in Figs. 5, 6 and 7. These charts are made in the following manner. The ordinate of said charts is in increments of 5,000 pounds from zero, inasmuch as the maximum load that can be placed in any compartment is illustratively 5,000 pounds. The abscissa of said charts is in increments of moments of 2,000,000 inch pounds from zero. Starting with a maximum load of say 5,000 pounds, which can be distributed in one compartment of the aircraft, the moments of each compartment are determined and added. Thus, for example, in an aircraft of the type in which compartment C is to carry a maximum load of 5,000 pounds and has its center 252.5 inches from the nose wheel, the moment is equal to 1,262,500 inch pounds, i. e., 5,000 × 252.5 and this point is indicated at P on the chart in Fig. 5, which point is connected by a line 299 to the origin O and marked "C." If the maximum that the two compartments C and D can carry is 10,000 pounds (5,000 pounds each), the moment of compartment C is 1,262,500 as above and as the center of compartment D is 316.5 inches from the nose wheel, the moment of the weight in compartment D is 5,000 × 316.5 or 1,582,500 inch pounds. The sum of these moments is 2,845,000 inch pounds which is indicated on the chart in Fig. 5 at P', which point is connected by a straight line to the origin O. Similar computations are made for increasing maximum weights up to 65,000 pounds in increments of 5,000 pounds and corresponding increase in number of compartments leading to the following tabulation for the chart in Fig. 5:

| Total Cargo Load | Compartment | Distance of Center of Compartment from Nose Wheel | Total Moment |
| --- | --- | --- | --- |
| 5,000 | C (1) | C-252.5 | 1,262,500 |
| 10,000 | C to D (2) | D-316.5 | 2,845,000 |
| 15,000 | C to E (3) | E-379.5 | 4,742,500 |
| 20,000 | C to F (4) | F-435.5 | 6,920,000 |
| 25,000 | C to G (5) | G-486.5 | 9,352,500 |
| 30,000 | C to H (6) | H-542.5 | 12,065,000 |
| 35,000 | C to I (7) | I-596.5 | 15,047,500 |
| 40,000 | C to J (8) | J-644.5 | 18,270,000 |
| 45,000 | C to K (9) | K-692.5 | 21,732,500 |
| 50,000 | C to L (10) | L-740.5 | 25,435,000 |
| 55,000 | C to M (11) | M-788.5 | 29,377,500 |
| 60,000 | C to N (12) | N-836.5 | 33,560,000 |
| 65,000 | C to O (13) | O-892.5 | 38,012,500 |

Similarly, the chart shown in Fig. 6 represents the distribution of a weight of 60,000 rather than 65,000 pounds, starting with 5,000 pounds in compartment D rather than with compartment C. The chart shown in Fig. 7 represents the distribution of a weight of 55,000 pounds starting with 5,000 pounds in compartment E, and additional charts may be made in a similar manner for compartment F through O, G through O and so on.

The sequence selector switch 249 for the aircraft having the characteristics set forth in the above tabulation is formed by arranging the arcuate rows of contacts 263, 264, etc. of selector switch 249 so as to correspond to the slope lines on the charts shown in Figs. 5, 6, 7, etc., for sequences of compartments starting with thirteen in the illustrative embodiment, i. e., C through O, and decreasing by one, i. e., D through O, E through O, etc. Thus, with the axis of the selector arm 248 being at the origin "O" of said Figs. 5, 6 and 7, etc. to form arcuate row 263, the radiating slope lines shown in Fig. 5 may be drawn on panel 261, Fig. 3, and the contacts 262 in arcuate row 263 associated with the thirteen compartment sequence starting with "C" compartment arranged so that a single contact will be associated with each of such slope lines with the width of each contact being desirably such as to extend half way on each side of the slope line. The successive arcuate rows 264, etc. are formed in the same manner by following the slope lines of charts 6, 7, etc.

In the same way compartment sequence selector switches could be made for other models or types of cargo aircraft from a series of charts made according to the principles of those shown in Figs. 5, 6 and 7.

Operation

It will be assumed that the aircraft heretofore referred to has thirteen compartments and for purposes of illustration is to take a cargo of 20,000 pounds. That aircraft was described as having one nose wheel, a pair of main wheels 437 inches therefrom, a basic weight (i. e. entire weight less cargo) of 86,000 pounds, an MAC 154 inches in length with its leading edge 368 inches from the nose wheel, permissible limits of CG between 390 and 420 inches from the nose wheel and a lower limit of 14.3% and an upper limit of 33.8% of MAC for the position of the center of gravity, the basic center of gravity being 386 inches from the nose wheel.

The aircraft without cargo is positioned with its nose wheel on weighing scales 41 and its two main wheels on weighing scales 42 and 43 respectively.

The aircraft selector knob 20 is now rotated to the type aircraft to be loaded in which position, for example, the respective arms 59, 195 and 255 of sections A, B and C of switch 58 will engage fixed contacts 62, 196 and 252 associated with resistances 63, 197 and lead 251 of such sections A, B and C of the switch.

The control switch 301 is thereupon manually turned to "start" position in which arm 302 engages conducting member 303 to complete a circuit by way of lead 305 from positive main 55 to the coils 33 of relays 32 of bridges B-1, B-2 and B-3 thereby to bring the movable arms 34 thereof into engagement with corresponding fixed contacts 31 and thereby to energize such bridges to determine the moment of the aircraft at time of weighing, weight of the aircraft at time of weighing and the distance of the center of gravity of such aircraft from the nose wheel respectively.

The aircraft resting on main wheel scales 42 and 43 will move arms 48 and 48' to place in circuit so much of the associated resistors 52, 52' as is of ohmic value proportional to the weight resting on such scales, for example, one ohm being equal to one pound.

As the sum of resistors 52, 52' (which form one arm of bridge B-1) is a value proportional to the weight on the main wheels and the value of resistor 63 (in a second arm of said bridge) is proportional to the distance of such wheels from the nose wheel of the aircraft, the product of such two values would be proportional to the moment of the weight on the main wheels with respect to the nose wheel of the aircraft.

From the formula:

$$\frac{\text{Weight (resistors } 52+52')}{\text{Resistor } 69} = \frac{\text{Balancing resistor (73)}}{\text{Wheelbase resistor (63)}}$$

it is apparent that for the bridge B-1 to be in balance the value of the moment resistor 73 must be equal to the product of the weight resistors (52+52') and the wheelbase resistor (63) divided by the value of the resistor 69.

For one ohm of resistor 73 to equal 10,000 pounds, the resistor 69 is set at 10,000 ohms so that the resultant product of weight and wheelbase will equal the moment divided by 10,000.

As the bridge B-1 ordinarily will be unbalanced, current will flow through the associated servo-amplifier 26 to energize servo-motor 36 and rotate drum 38. As a result, wiper arm 79 will cut into circuit so much of resistor 73 as has an ohmic value equal to:

$$\frac{(\text{Resistor } 52 + \text{resistor } 52')(\text{resistor } 63)}{10,000}$$

Thus, the value of resistor 73 placed in circuit will be proportional to the product of the weight on the two main wheels and their distance along the longitudinal axis of the aircraft from the nose wheel.

At the same time wiper arm 81 will cut into circuit so much of resistor 75 as has an ohmic value also proportional to the product of the weight on the two main wheels and their distance from the nose wheel of the aircraft.

As, in the illustrative example, the product of the weight on the two main wheels (i. e., 76,020 pounds) and the distance from the nose wheel (i. e. 437 inches) equals 33,220,740 inch pounds, the value of resistors 73 and 75 placed in circuit will be equal to 3,322 ohms.

The weight of the aircraft on the scales 41, 42 and 43 moreover causes movable arms 44, 49 and 49' controlled thereby to tap off so much of resistors 46, 53 and 53' as corresponds respectively to the weight on the nose wheel and that on the two main wheels. As one ohm was taken to correspond to one pound, the combined values of resistors 46, 53 and 53' placed in circuit and corresponding to the basic weight of 86,000 pounds is 86,000 ohms and said series connected resistors form one arm of aircraft and cargo weight accumulator bridge B–2 and the annular resistor 91 forms another arm of said bridge.

Current will flow through the servo-amplifier 26 to energize servo-motor 36 until bridge B–3 is balanced. In this balancing, wiper arm 95 of bridge B–3 cuts into circuit so much of resistor 91 as equals the value of the series connected resistors 46, 53 and 53', i. e., 86,000 ohms (related to 86,000 pounds, i. e. the weight of the aircraft at the time of weighing, illustratively loaded with all but cargo) and such weight will be indicated by the drum 38 of bridge B–3. At the same time wiper arm 96 will cut in so much of resistor 86 as has an ohmic value proportional to the total weight of 86,000 pounds.

The resistor 86 is desirably calibrated so that 10,000 pounds is equal to one ohm. Consequently, 8.6 ohms of resistor 86 will be placed in circuit with a basic weight of 86,000 pounds on the scales. Resistor 86 and resistor 75 form one pair of adjacent arms of bridge B–2 and the resistor 80 and the center of gravity balancing resistor 82 form the other pair of adjacent arms of bridge B–2. By the formula:

$$\frac{\text{Total moment (resistor 75)}}{\text{Total weight (resistor 86)}} = \frac{\text{Center of gravity (resistor 82)}}{\text{Resistor 80}}$$

it is apparent that the center of gravity is proportional to the quotient of total moment divided by the total weight. Assuming that the value of the resistor 80 is one ohm, as bridge B–2 will normally be unbalanced, its servo-motor 36 will rotate until wiper arm 88 places so much of resistor 82 in circuit as is equal to the quotient of the total moment divided by the total weight. As the total moment is illustratively set at 3,322 ohms and as the total weight is set at 8.6 ohms, it is apparent that the distance of center of gravity from the nose wheel will appear as 386 inches and such center of gravity is directly indicated on drum 38 of bridge B–2.

As the basic weight of the aircraft is 86,000 pounds, if it is desired to load a cargo of 20,000 pounds, by merely subtracting such basic weight from the maximum permissible gross take-off weight set by the manufacturer of the aircraft, which illustratively is 120,000 pounds, it is readily apparent that the cargo of 20,000 pounds can be carried.

The arm 166 of the cargo weight selector switch 160 is next rotated by hand until so much of resistor 165 is placed in circuit as corresponds to a cargo weight of 20,000 pounds, that is, where one ohm corresponds to one pound, 20,000 ohms of resistor 165 will be placed in circuit for a cargo weight of 20,000 pounds.

The next step in the operation is manually to rotate arm 302 of control switch 301 to "pre-load" position. In this position the bridges B–1, B–2 and B–3 which indicate the moment of the aircraft as the loading proceeds, the aircraft and cargo weight and the center of gravity as the loading proceeds respectively, will stay energized due to the fact that conducting member 303 remains engaged by arm 302. A circuit will be completed from positive main 55 through arms 302 and lead 306 to the coil 108 of relay 106 to close contacts 104, 111 and to the coil 33 of relay 32 of bridges B–5, B–8 and B–10, the basic weight, the gross weight and the gross moment bridges respectively, to close contacts 31, 34 to complete circuits from the servo-amplifiers to the associated servo-motors.

At the same time as scale arms 48, 48' and 44, 49, 49' moved due to the weight of the aircraft on scales 41, 42 and 43, scale arms 45, 51 and 51' also moved to place in circuit so much of series connected resistors 47, 54 and 54' as has ohmic value proportional to the weight of the aircraft on the nose wheel and the two main wheels respectively, i. e. a total of 86,000 ohms corresponding to a basic weight of 86,000 pounds and the series-connected resistor 47, 54 and 54' will form one arm of bridge B–5 due to the previously energized relay 106. Current will flow through servo-amplifier 26 of bridge B–5 to energize its servo-motor 36 causing its wiper arm 138 to cut in so much of resistor 136 as equals that of the series-connected resistors 47, 54 and 54', i. e. 86,000 ohms.

Resistor 148 on panel 151 which is controlled by drum 156 being ganged to rotate with drum 38 of bridge B–3 has a value of 86,000 ohms corresponding to the weight of the aircraft, i. e., 86,000 pounds and as resistor 165 of cargo weight selector switch 160 in series with resistor 148 has been set to a value of 20,000 ohms corresponding to the weight of cargo to be loaded, i. e., 20,000 pounds, the combined values of resistors 148 and 165 of 106,000 ohms will correspond to a gross weight of 106,000 pounds.

These resistors form one arm of gross weight bridge B–8 which will be placed in balance by its servomotor 36 operated from its servo-amplifier 26 when wiper arm 192 has cut in so much of resistor 186 as has ohmic value corresponding to a total weight of 106,000 pounds, i. e., 106,000 ohms (and this weight of 106,000 pounds will be indicated on the periphery of drum 38 of bridge B–8). At the same time wiper arm 191 will tap off so much of resistance bank 188 as has ohmic value corresponding to 106,000 pounds, i. e., 106,000 ohms.

The resistor 188 which has a value of 106,000 ohms forms one arm of bridge B–10, a balancing resistor 204 being in a second arm of such bridge. The resistor 197 which has been set to a value equal to the distance of the optimum center of gravity of the aircraft from the nose wheel, i. e., 405 inches and has a value of 405 ohms is in another arm of the bridge opposed to the resistor 188 and a resistor 190 which desirably has a value of 10,000 ohms is connected in the fourth arm of the bridge.

By the formula:

$$\frac{\text{Weight resistance (188)}}{\text{Resistance (190)}} = \frac{\text{Moment resistance (204)}}{\text{Arm resistance (197)}}$$

for bridge B–10 to be balanced, the value of the total moment resistance must be equal to 4,293 ohms which represents 42,930,000 inch pounds, which is the gross moment of the aircraft. As bridge B–10 normally will be unbalanced, current will flow through servo-amplifier 26 of bridge B–10 to energize its servo-motor 36 and cause wiper arm 209 to cut in so much of resistor 204 as has ohmic value equal to that of the product of the weight and the arm divided by 10,000 or 4,293 ohms at which time the bridge will be balanced and servomotor 36 will be de-energized. At the same time, wiper arm 208 will tap off so much of resistor 206 as has ohmic value corresponding to the total moment of 42,930,000 inch pounds or 4,293 ohms for use in the subsequent operation of the equipment as will hereinafter be described.

The next step in the operation of the equipment is manually to rotate the arm 302 of control switch 301 to compartment "C" position. In this position the "preload" contact having been disengaged, relay 106 and bridges B-5, B-8 and B-10 will be de-energized and the resistor 136 of basic weight bridge B-5 will remain set at 86,000 ohms related to the basic weight of 86,000 pounds, the resistor 186 of gross weight bridge B-8 will remain set at 106,000 ohms related to the gross weight of 106,000 pounds and the resistor 206 of gross moment bridge B-10 will remain set at 4,293 ohms related to the gross moment of 42,930,000 inch pounds. Bridges B-1, B-2 and B-3 will stay energized as previously described and as arm 302 engages conducting member 300, the coil 133 of relay 131 and the coil 33 of relay 32 of the cargo weight accumulator bridge B-6 will be energized.

The energization of relay 131 will connect annular resistor 136 which has been previously set to a value of 86,000 ohms corresponding to a weight of 86,000 pounds in series with annular resistor 143 connect to point 24 of bridge B-6 to form one arm of said bridge. The annular resistor 146 on panel 151 which has been set to 86,000 ohms, corresponding to 86,000 pounds, the present weight of the aircraft, through lead 161 connects to point 23 of said bridge B-6 to form a second arm thereof. Current will flow through its servo-amplifier 26 to energize its servo-motor 36 until drum 38 of bridge B-6 rotates its wiper arm 145 to bring into circuit so much of resistor 143 as is equal to the difference between resistor 146 and resistor 136, i. e., zero in the present instance which is the weight of cargo thus far loaded into the aircraft and such indication of the weight of cargo thus far loaded into the aircraft will be afforded on the periphery of the drum 38 of bridge B-6.

In addition, when arm 302 engages compartment "C" contact, a circuit will be completed from positive main 55 through arm 302, lead 309, main 311, time delay relay 312, lead 313 to one side of timing motor M, the other side of which is connected to negative main 25.

When motor M starts to rotate, the discs 315, 316, 317, 318 and 330 driven thereby will also be rotated. The periphery of disc 315 will engage wiper arm 314 connected to the positive side of motor M to complete a holding circuit from positive main 55, arm 302, lead 309, main 311, lead 319, disc 315, wiper arm 314 to said motor. At this time the time-delay relay 312 will open, but will have no effect on the motor M due to the holding circuit therefor. The periphery of disc 316 which is also connected to positive main 55 through lead 319, will contact wiper arm 322 to complete a circuit through lead 325 to the coil 107 of relay 105 and to the coil 33 of relay 32 of bridge B-4, which determines the aircraft and accumulated cargo weight prior to the loading of the next compartment.

Energization of relay 105 will bring its movable arm 103 into engagement with fixed contact 109 to connect the series connected scale resistors 47, 54 and 54' to point 23 of bridge B-4. Current will flow through servo-amplifier 26 to energize servo-motor 36 of bridge B-4 until its drum 38 has moved wiper arm 123 to cut into circuit so much of resistor 121 as corresponds to the 86,000 ohm value of resistors 47, 54 and 54' for a weight of 86,000 pounds which is the weight of the aircraft before compartment "C" is loaded. The resistor 121 thus will be set to a value of 86,000 ohms.

After a sufficient period of time to permit the servomotor 36 of bridge B-4 to come to rest, the periphery of disc 317 which is also connected to positive main 55 through lead 319, will engage wiper arm 323 to complete circuits through lead 326 to the coil 183 of the relay 181 and to the coils 33 of the relays 32 of bridges B-9, B-11 and B-12 which are the remaining cargo weight, the remaining cargo moment and the sequence selector bridges respectively.

The energization of relay 181 will connect annular resistor 186, which has been previously set to a value of 106,000 ohms corresponding to a total gross weight of 106,000 pounds, by way of leads 185 and 228 to point 23 of bridge B-9 to form one arm thereof. The annular resistor 149 on panel 151 which has been set to a value of 86,000 ohms corresponding to the present weight of the aircraft, i. e., 86,000 pounds, is connected by lead 169 in series with annular resistor 231 of bridge B-9 to form another arm of said bridge.

Current will flow through servo-amplifier 26 to energize servo-motor 36 of bridge B-9 until its drum 38 has moved its wiper arm 234 to cut into circuit so much of resistor 231 as is equal to the difference between resistor 186 corresponding to 106,000 pounds (total gross weight) and resistor 149, corresponding to 86,000 pounds (present weight), or 20,000 ohms corresponding to 20,000 pounds which is the remaining cargo weight to be loaded into the aircraft or the allowable cabin load. At the same time wiper arm 235 of bridge B-9 will cut into circuit so much of resistor 232 as has ohmic value equal to 20,000 pounds. The resistor 232 is desirably calibrated so that one ohm equals 10,000 pounds. Consequently, two ohms will be placed in circuit for a weight of 20,000 pounds.

The annular resistor 222 which has been previously set to an ohmic value proportional to the total moment of the unloaded aircraft, i. e., 33,220,740 inch pounds, by ganging drum 225 and drum 38 of bridge B-1, has an ohmic value of 3,322 ohms, and is connected in series by lead 221 with annular resistor 215 of bridge B-11 to form one arm of said bridge. The annular resistor 206 of bridge B-10 which has been previously set to a value proportional to the total gross moment, i. e., 42,930,000 inch pounds and has a value of 4,293 ohms is connected by lead 211 to form a second arm of bridge B-11.

Current will flow through servo-amplifier 26 to energize servo-motor 36 of bridge B-11 until its drum 38 has rotated its wiper arm 218 to cut into circuit so much of resistor 215 as corresponds to the difference between resistors 206 and 202, i. e. 971 ohms which is approximately proportional to 9,709,260 inch pounds (the difference between 42,930,000 and 33,220,740 inch pounds). This is the remaining cargo moment related to the allowable cabin load of 20,000 pounds.

At the same time, wiper arm 219 will engage that portion of resistor 217 of ohmic value equal to 971 ohms.

As the resistor 232 of bridge B-9 of 2 ohms which is proportional to a weight of 20,000 pounds is connected by lead 238 to point 23 of bridge B-12 to form one arm of such bridge and the resistor 217 of bridge B-11 of 971 ohms, which is approximately proportional to the remaining cargo moment of 9,709,260 inch pounds, is is connected by lead 241 also to point 23 of bridge B-12 to form another arm of such bridge, by the formula:

$$\frac{\text{Remaining weight resistor (232)}}{\text{Remaining moment resistor (217)}} = \frac{\text{Resistor 243}}{\text{Resistor 239}}$$

it is apparent that the variable resistor 243 will be set to a value proportional to the quotient of the weight resistor divided by the moment resistor.

Current will flow through servo-amplifier 26 to energize servo-motor 36 of bridge B-12 until its drum 38 has rotated its wiper arm 245 to cut in so much of resistor 243 as is of ohmic value equal to the quotient of the weight divided by the moment. In order that the variable resistor 243 will attain a utilizable value, the resistor 239 is set to a value of 10,000 ohms, so that the variable resistor 243 will be set to a value of approximately 20.6 ohms.

The rotation of drum 38 of bridge B–12 moves selector arm 248 of selector switch 249 ganged therewith to corresponding position determined by such remaining weight and moment, each combination thereof moving the selector arm 248 to a predetermined position so that it engages one or more of the segments 262 on one or more of the thirteen arcuate rows 263, 264 etc. shown in Fig. 3.

Referring to the chart shown in Fig. 5, for a total remaining cargo moment of 9,709,260 inch pounds, and a remaining cargo weight of 20,000 pounds, a position is determined adjacent slope line C—K on the chart. As such remaining moment and weight corresponds to the slope line C—K, as previously described, the selector arm 248 will be rotated to a corresponding position and hence the segment C—K on row 263, for example, will be engaged by the selector arm 248 indicating that the load of 20,000 pounds is to be divided equally in nine compartments, i. e., approximately 2,222 pounds in each compartment.

When compartment selector switch 267 is at compartment "C" position with contact arms 271 engaging fixed contacts 266 of each of the thirteen sections $a$ to $m$; when selector arm 248 is engaging the contact 262 on row 263 representing the C—K slope line; when the aircraft selector switch 58C is at type A position, as shown, and the control switch 301 is at compartment "C" position, a circuit will be completed from positive main 55, arm 255 of switch 58C, contact 252, lead 251, arm 248, contact 262 (C—K), lead 265 to fixed contact 266 of ninth section "$i$" of switch 267, movable arm 271 engaging said fixed contact, lead 260 to one side of the coil of the ninth relay 273$i$ and thence to negative main 25.

Energization of the coil of relay 273$i$ will bring movable arm 276 thereof into engagement with fixed contact 278 so that a circuit will be completed from negative main 25, through resistor 280$i$, closed contacts 276, 278 of ninth section "$i$" of switch 267, lead 281 to point 23 of bridge B–13, i. e. the compartment loading director bridge. Thus, the resistor 280$i$ forms one arm of bridge B–13. By the formula:

$$\frac{\text{Resistor 291}}{\text{Resistor 280}i} = \frac{\text{Resistor 285}}{\text{Resistor 290}}$$

it is apparent that the resistor 285, when the bridge B–13 is balanced, will be proportional to the quotient of resistor 291 divided by resistor 280$i$.

As previously described, the resistor 280$i$ is calibrated to equal 9 ohms related to a sequence of nine compartments. As the drum 293, which carries the wiper arm 294, engaging resistor 291, is ganged with drum 38 of the remaining cargo weight bridge B–9, the wiper arm 294 will cut into circuit that portion of resistor 291 that corresponds to a weight of 20,000 pounds, i. e. 20,000 ohms.

A short interval of time after the periphery of disc 317 engages its wiper arm 323, the periphery of disc 316 will disengage its wiper arm 322 and the peripheries of discs 318 and 330 will engage their respective wiper arms 324 and 340. When disc 316 disengages wiper arm 322, relay 105 and bridge B–4 will be de-energized, the resistor 121 remaining set at an ohmic value of 86,000 corresponding to a weight of 86,000 pounds. When disc 318 engages wiper arm 324, the coil 33 of relay 32 of compartment loading director bridge B–13 will be energized through lead 327 and when disc 330 engages wiper arm 340, the coil 33 of relay 32 of compartment weight accumulator bridge B–7 and the coil 117 of relay 115 will be energized through lead 350.

As bridge B–13 ordinarily will be unbalanced, current will flow through its servo-amplifier 26 to energize servo-motor 36. Drum 38 will rotate until wiper arm 287 cuts in so much of the resistor 285 as is proportional to the quotient of the value of resistor 291, i. e., 20,000 ohms divided by resistor 280$i$, i. e. 9 ohms and as resistor 290 desirably has a value of one ohm, resistor 285 will be set to 2,222 ohms at which time bridge B–13 will be in balance and the periphery of drum 38 will indicate a weight of 2,222 pounds which is the weight to be placed into compartment "C."

Upon continued rotation of disc 317, its periphery will disengage wiper arm 323 and the resistor 232 of bridge B–9 will remain set at 2 ohms, proportional to a weight of 20,000 pounds, resistor 217 of bridge B–11 will remain set at 971 ohms approximately proportional to 9,709,260 inch pounds and resistor 243 of bridge B–12 will remain set at 20.6 ohms.

With further rotation of disc 318, its periphery will disengage wiper arm 324 and resistor 285 of compartment loading director bridge B–13 will remain set at 2,222 ohms, so that drum 38 will indicate 2,222 pounds as the weight to be loaded into compartment "C." At the same time the periphery of disc 315 will disengage wiper arm 314 to de-energize motor M and stop further rotation of the discs.

When this occurs, the periphery of disc 330 will still engage wiper arm 340 so that the circuit to relay 115 and relay 32 of bridge B–7 will remain completed.

The bridge B–7 which is actuated by the energization of its relay 32, will rotate the drum 38 controlled thereby to indicate the amount of cargo loaded into compartment "C" of the aircraft, which is equal to the difference between the present total weight of the aircraft set on resistor 147 on panel 151 and the weight of the aircraft of 86,000 pounds set on resistor 121 of bridge B–4. Resistors 121 of bridge B–4 and 174 of bridge B–7 which are connected in series through contacts 116, 118 of relay 115, form one arm of bridge B–7 and resistor 147 on panel 151, which is set by the rotation of drum 38 of bridge B–3, to the present accumulated weight of the aircraft, will form another arm of such bridge B–7. As a result, the drum 38 of compartment weight accumulator bridge B–7 will rotate to tap off a value of resistor 174 equal to the difference between resistor 147 and resistor 121 and as such resistors at this time both have a value of 86,000 ohms, the drum 38 of bridge B–7 will rotate to a "0" indication on its periphery, as no cargo has as yet been loaded.

The cargo loading supervisor then attempts to load the exact weight of 2,222 pounds into compartment "C."

As cargo is placed into compartment "C" and the total weight of the aircraft increases, the movable arms 44, 45, 48, 48', 49, 49' and 51, 51' actuated by the weighing scales 41, 42 and 43 will each engage that portion of the associated resistor corresponding to the new weight of the aircraft. As the result, the accumulated total weight of the aircraft will be indicated by drum 38 of bridge B–3 and the distance from the nose wheel of the center of gravity of the aircraft as thus far loaded, will be indicated by the drum 38 of bridge B–2.

Assuming that 2,222 pounds is now actually loaded into compartment "C," that load will be indicated by the drum 38 of bridge B–7 as previously described. In addition, as resistor 146 on panel 151 which has a value equal to the accumulated total weight, i. e., the basic weight of 86,000 pounds plus 2,222 pounds loaded into compartment "C" or a total of 88,222 pounds forms one arm of aircraft and cargo weight accumulator bridge B–6 and as resistor 136 of bridge B–5, which has been set to the basic weight of 86,000 pounds is in series with resistor 143 of bridge B–6, through closed contacts 132, 134 of relay 131 and forms another arm of bridge B–6, the associated drum 38 of bridge B–6 will rotate to the difference between such values or 2,222 pounds, to indicate the weight of cargo thus far loaded into the aircraft.

As drum 38 of compartment loading director bridge B–13 indicated that 2,222 pounds was to be loaded into compartment "C," and as the drum 38 of compartment weight accumulator bridge B–7 indicates that such weight has been loaded, no further loading of compartment "C" will be done. Control switch 301 is accordingly rotated to the next or compartment "D" position and switch 267 is rotated so that contact arms 271 engage the contacts 268.

In this position the bridges B–1, B–2 and B–3 will remain energized through lead 305 to the coils 33 of relays 32 of said bridges so that the associated drums 38 thereof will be set at the moment of the present weight of the aircraft, thus far loaded on the main wheels with reference to nose wheel, the accumulated total weight of the aircraft and cargo and the distance of center of gravity from the nose wheel of the aircraft thus far loaded. The bridge B–6 will remain energized to indicate the cargo weight of 2,222 pounds thus far loaded in the aircraft.

At compartment "D" position, motor M will be energized to rotate the discs 315, 316, 317, 318 and 330. As disc 330 rotates, the periphery thereof will move away from wiper arm 340 to break the circuit to coil 117 of relay 115 and coil 33 of relay 32 of compartment weight accumulator bridge B–7. As a result, arm 116 of relay 115 will again engage fixed contact 114. The operation of discs 315, 316, 317, 318 and 330 will then function in the same manner as previously described with respect to compartment "C."

At this time, the total moment of the aircraft with respect to the nose wheel, determined by bridge B–7 will be equal to the basic moment of 33,220,740 inch pounds plus the moment of the weight of 2,222 pounds in compartment "C" (i. e. 2,222 times 252.5 or 361,055 inch pounds for an equal distribution of weight in such compartment) or a total of 33,781,795 inch pounds. As the main wheels are 437 inches from the nose wheel, the weight on the main wheels will be equal to 33,781,795 divided by 437 or 77,304 pounds.

As the aircraft is on the scales 41, 42, 43, immediately upon loading, the movable arm 48, 48' of the main wheel scales 42, 43 will tap off so much of resistors 52, 52' as is equal to 77,304 pounds or 77,304 ohms.

As previously described, as bridge B–1 is normally unbalanced, the drum 38 will be rotated until wiper arm 79 taps off so much of resistor 73 as is equal to the product of the weight and the wheel base, i. e., 73,304 pounds multiplied by 437 inches. By reason of the 10,000 ohm resistor 69 in bridge B–1, the value of resistor 73 placed in circuit will be proportional to 33,781,795 inch pounds or approximately 3,378 ohms which includes the basic moment of the aircraft plus the moment due to the weight of 2,222 pounds in compartment "C." Hence, drum 225 which is driven by and in unison with the drum 38 of bridge B–1 will tap off so much of resistor 222 as is proportional to the total moment of 33,781,795 inch pounds or approximately 3,378 ohms.

As resistor 222 is in series with resistor 215 of bridge B–11, and forms one arm of said bridge and resistor 206 of bridge B–10 forms another arm of bridge B–11, the bridge will be unbalanced and its servo-motor 36 will rotate the drum 38 to cut into circuit so much of resistor 215 as has ohmic value equal to the difference between the gross moment of the fully loaded aircraft, i. e., 42,930,000 inch pounds and the present moment 33,781,795 inch pounds or 9,148,205 inch pounds represened by an ohmic value of 9,148. At the same time wiper arm 219 of the drum of bridge B–11 will cut into circuit so much of resistor 217 as has an ohmic value equal to 9,148 ohms.

Resistor 186 of bridge B–8 which has a value of 106,000 ohms corresponding to the gross weight of the aircraft of 106,000 pounds, forms one arm of bridge B–9, the resistor 149 on panel 151 which has an ohmic value corresponding to the present total weight of 86,000 plus 2,222 pounds or 88,222 pounds is in series with resistor 231 and forms the adjacent arm of said bridge. Servo-motor 36 will rotate drum 38 of bridge B–9 until wiper arm 234 taps off so much of resistor 231 as has an ohmic value equal to the difference between 106,000 pounds and 88,222 pounds or 17,778 pounds. At the same time wiper arm 235 on the drum 38 of bridge B–9 will cut into circuit 1.8 ohms of resistor 232 which is approximately equal to 17,778 pounds divided by 10,000. As resistors 232 of bridge B–9 and 217 of bridge B–11 are both connected to junction 23 of bridge B–12, as previously described, servo-amplifier 26 will be energized to rotate servo-motor 36 of bridge B–12 and its drum 38 will rotate until so much of resistor 243 is placed in the circuit as equals the quotient of $$\frac{\text{Remaining weight (resistor 232)} \times 10,000}{\text{Remaining moment (resistor 217)}} = 19.7 \text{ ohms}$$

The rotation of drum 38 of bridge B–12 will rotate selector arm 248 in unison therewith to engage one of the contacts on row 264 related to compartment "D."

Referring to the chart in Fig. 6, as the remaining cargo weight is 17,778 pounds and the remaining cargo moment is 9,148,205 inch pounds, the interception of these two values on chart in Fig. 6 is next to the D—K line. Consequently, selector arm 248 will engage that contact 262 on row 264 which corresponds to the D—K line. As a result of the circuits previously described, the eighth resistor 280h will be placed in the compartment loading director bridge B–13.

As the drum 293 of bridge B–13 will be rotated by drum 38 of bridge B–9 to position corresponding to remaining cargo weight of 17,778 pounds, wiper arm 294 of said drum will cut into circuit that portion of resistor 291 corresponding to 17,778 ohms and as previously described, the drum 38 of the compartment loading director bridge B–13 will rotate due to the energization of its servo-motor 36, to tap off 2,222 ohms on resistance 285 of bridge B–13 which is equal to $$\frac{17{,}778}{8}$$

and such value of 2,222 pounds will be indicated on the periphery of drum 38 as the weight to be loaded into the next compartment "D."

When the control arm 302 was turned to compartment "D" position, the relay 32 of bridge B–4 would be energized in the manner previously described and relay 105 also was energized. Hence, the accumulated weight of 88,222 pounds or 88,222 ohms would form one arm of bridge B–4 so that drum 38 would rotate to tap off on resistor 121 resistance corresponding to said total weight.

When relay 115 and relay 32 of bridge B–7 are energized, a resistor of ohmic value corresponding to 88,222 pounds will form one arm of said bridge B–7 in series with resistor 174 and resistor 147 on panel 151 of ohmic value corresponding to the accumulated weight of 88,222 pounds will form the opposed arm of said bridge.

Hence, the drum 38 of bridge B–7 will rotate to the zero position on its periphery to indicate that no weight has as yet been loaded into compartment "D." As weight is loaded into this compartment, drum 38 of bridge B–7 will rotate so that the value of resistor 174 in circuit will always be the difference between resistors 147 and 121 to indicate the weight being loaded into compartment "D" from zero to the final weight loaded.

The bridge B–6 being continuously in circuit will indicate the weight thus far loaded into the aircraft as previously described and the drum 38 thereof will indicate 2,222 pounds plus the weight loaded into compartment "D." It may readily be calculated that if such weight of 2,222 pounds is loaded into each of the compartments "C" to "K" inclusive of the aircraft, the final center of gravity of the aircraft with respect to the nose wheel, will be approximately equal to the desired value of 405 inches. Such calculation may be made by multiplying the distance of the center of each compartment "C" to "K" inclusive from the nose wheel by the weight of 2,222 pounds, adding each of such products to secure a total moment, adding to this moment the basic moment of the aircraft, i. e., 33,239,000 inch pounds and dividing such total moment by the total weight of the aircraft, i. e., of 86,000 pounds plus the load of 20,000 pounds.

By making such calculations it is found that the total moment is approximately 42,895,634, and this moment divided by 106,000 equals 404.7.

The distance from the nose wheel of the center of gravity of 404.7 thus determined is clearly within the permissible limits of MAC set by the manufacturer, i. e., 390 to 420 inches in the illustrative case and is equal to 23.6 per cent MAC, only .4 per cent from the optimum per cent MAC of 24. Even this slight divergence would be eliminated in those cases in which the remaining cargo moment and remaining cargo weight were of such values as to lie directly on the slope lines shown in the charts in Figs. 5, 6 and 7.

In the event that less than the 2,222 pounds indicated for compartment "C," as previously described, i. e., say 1,500 pounds is then loaded, the total moment of the aircraft would be the basic moment of 33,220,740 plus the moment of compartment "C," i. e.

$$1{,}500 \times 252.5 = 378{,}750$$

or 33,599,490 inch pounds where such weight is distributed equally in the compartment.

Resistor 222, controlled by bridge B–1 as previously described, which is connected in series with resistor 215 of bridge B–11 to form one arm of said bridge is set to 3,360 ohms approximately proportional to 33,599,490 inch pounds. The resistor 206 of bridge B–10 which forms the opposed arm of said bridge is set to 4,293 ohms proportional to 42,930,000 inch pounds.

The bridge B–11 will be energized so that drum 38 will rotate until wiper arm 218 taps off so much of resistor 215 as has ohmic value proportional to the difference between resistor 206 which has a value of 4,293 ohms proportional to the gross moment of 42,930,000 inch pounds and resistor 222 which has a value of 3,360 ohms approximately proportional to the accumulated moment (33,599,490 inch pounds) or 933 ohms approximately proportional to 9,330,510 inch pounds.

At the same time wiper arm 219 of bridge B–11 will engage that portion of resistor 217 of ohmic value equal to 933 ohms.

The resistor 149 on panel 151 which has ohmic value corresponding to a weight of 86,000 plus 1,500 or 87,500 pounds is connected in series with resistor 231 of bridge B–9 to form one arm of said bridge. The resistor 186 of bridge B–8 which has an ohmic value corresponding to a weight of 106,000 pounds forms the opposed arm of bridge B–9.

The brdige B–9 will be energized until its wiper arm 234 taps off so much of resistor 231 as is proportional to the difference between 106,000 and 87,500 pounds or 18,500 ohms.

At the same time, wiper arm 235 will tap off so much of resistor 232 as is approximately proportional to 18,500 pounds or 1.8 ohms and this resistance is connected to point 23 of bridge B–12.

By the formula:

$$\frac{\text{Remaining weight resistor (232)}}{\text{Remaining moment resistor (217)}} = \frac{\text{Resistor 243}}{\text{Resistor 239}}$$

it is apparent that as previously described, the variable resistance 243 will be set to a value proportional to the quotient of the weight resistor divided by the moment resistor or 19.3 ohms.

Selector arm 248 rotates with the drum of bridge B–12 to position determined by such remaining weight and moment to engage one of the thirteen segments on row 263.

As the remaining weight is 18,500 and the remaining moment 9,330,510, referring to the chart in Fig. 6, the segment associated with compartments "D" to "K" will be engaged indicating that the remaining weight of 18,500 pounds must be devided into eight compartments for the final desired center of gravity and the eighth resistor 280h will be placed in circuit in one arm of bridge B–13.

In the same manner as previously described, the drum 293 of bridge B–9 will be rotated to move the wiper arm 294 thereof to the 18,500 pound position on the resistor 291 so that 18,500 ohms of resistor 291 will be placed into circuit in another arm of bridge B–13.

By the formula:

$$\frac{\text{Resistor 291}}{\text{Resistor 280}h} = \frac{\text{Resistor 285}}{\text{Resistor 290}}$$

it is apparent that the resistor 285, when the bridge B–13 is balanced, will equal the value of resistor 291, i. e., 18,500 divided by the value of resistor 280h. As previously described, the resistor 280h is calibrated to equal 8 ohms related to a sequence of eight compartments. Consequently, drum 38 of bridge B–13 will rotate until wiper arm 287 taps off so much of resistance bank 285 as equals 2,313 ohms and this will be indicated in pounds as the weight to be loaded into compartment "D."

If the remaining compartments "E" to "K" inclusive are also loaded with 2,313 pounds (compartment "D" having been loaded with only 1,500 pounds), by calculating the moments of each of such loads and adding such total moment to the basic moment of the aircraft, this combined total moment divided by 106,000 pounds will equal 406.2 inches or approximately 405 inches, the desired final center of gravity.

In a similar manner, if more than the indicated 2,222 pounds is loaded into compartment "C," say 2,500 pounds, for example, the new total moment of the aircraft would be 33,220,740 plus (2,500×252.5) or 33,851,990 inch pounds and 9,078,010 inch pounds would be indicated by bridge B–11 and the remaining cargo weight of 17,500 by bridge B–9.

Consequently, as previously described, from the chart in Fig. 6, slope line "D" to "K" would be selected and the selector arm 248 would engage the "D" to "K" contact of row 264 to place in circuit the eighth resistor 280h of 8 ohms.

The drum 293 would be rotated to move its wiper arm 294 to the 17,500 pounds position of annular resistor 291 so that 17,500 ohms will be placed in circuit to form one arm of bridge B–13. Consequently, through the action of servomotor 36, wiper arm 287 will tap off so much of resistance 285 as is equal to 2,188 ohms, (17,500 divided by 8) and 2.188 pounds will be indicated as the weight to be loaded into compartment "D."

If the compartments "D" to "K" inclusive are loaded with 2,188 pounds (compartment "C" having been loaded with 2,500 pounds), the final center of gravity will be equal to 403.8 or approximately the desired final center of gravity of 405 inches.

In the illustrative loadings of the aircraft above described, it has been assumed that compartment "C" would first be loaded and subsequent compartments would then be loaded until the selected cargo of 20,000 pounds had been distributed in approximately nine compartments.

Under certain conditions, a load of 20,000 pounds, for example, cannot be distributed in nine compartments, but must be placed in the number of compartments based upon the length of the cargo. Thus, if a long box is to be loaded that weighs 20,000 pounds, the box must be loaded into those compartments of the aircraft which, when a total of 20,000 pounds is loaded will provide a final center of gravity of the loaded aircraft of approximately 405 inches.

If the equipment should be set to compartment "C" position, as previously described, for a weight of 20,000 pounds and a remaining cargo moment of 9,709,260 inch pounds, an indication of 2,222 pounds would be given as the load to be placed into compartment "C" and as the equipment is designed to effect equal loads in subsequent compartments, the Cargo Loading Supervisor would instantly be apprised that the 20,000 pound box would have to extend through nine compartments for the desired final center of gravity to be attained. Assuming the length of the box to extend for only five compartments, such box could not be loaded into the aircraft starting with compartment "C." The resultant weight indication when the compartment selector switch is turned to position "D" also shows that the box could not be loaded beginning with that compartment. When the compartment selector switch is turned to compartment "E," referring to the chart in Fig. 7 for a moment of 9,709,260 inch pounds and a weight of 20,000 pounds, it appears that the load could be distributed through compartments "E" to "I" inclusive, i. e. five compartments. The selector arm 248 would engage the contact on the third arcuate row (not shown) of selector switch 249 related to the "E" to "I" compartments and through circuits similar to those above described, the fifth resistor 280e would be placed in circuit, which resistance has a value of 5 ohms. By reason of the weight of 20,000 pounds of the box, the bridge B–13 would indicate that a weight of 4,000 pounds was to be loaded into compartment "E."

With the box loaded at compartment "E" and extending from compartment "E" to compartment "I," the total weight of the box would thus be distributed in five compartments and the final center of gravity would be 405.4 inches which is approximately the desired center of gravity of 405 inches.

While the Wheatstone bridge principle is shown in the drawings and fully described in the specification, it will be understood that this expedient is largely illustrative of means generally for opposing unbalanced impulses and automatically causing such unbalance to bring about desired balance.

It is also to be understood that instead of resistances being utilized as the electrical regulating means, reactances could be used in their place. Thus, as shown in Fig. 10, a weighing scale 351 would turn the rotor 352 of a variable condenser 353 connected on one side to point 23' of a bridge and at its other side by lead 354 to terminal 355 connected by lead 356 to one side of an oscillator 357. A second variable condenser 358 has one side connected by lead 359 to terminal 355 and its other side to point 24' of the bridge. The bridge desirably has variable condensers 361 and 362 connected on one side respectively to points 23' and 24' of the bridge and on their other sides to terminal 363 which is connected by lead 364 to the other side of the oscillator 357.

A servo-amplifier 26' is connected by input leads 365 and 366 to points 23' and 24' of the bridge and through lead 367 is connected to servo-motor 36' having its shaft 368 connected to the rotor 369 of capacitor 358. The rotor 369 is also ganged with a drum 371 to rotate the latter so that the wiper arm 372 carried thereby will cut into circuit so much of resistor 373 as corresponds to the weight on scale 351.

It will be apparent to one skilled in the art that the electrical equipment above described could readily be substituted for some or all in the equipment shown in Figs. 1 to 4 inclusive.

In addition to the foregoing, it is within the scope of the invention to utilize systems of electronic oscillators that operate the automatic adjusting motor by differences in frequencies and bring an adjustable oscillator to the frequency of an oscillator that is set by the parameter being measured or by the impulse applied. The frequency of the two oscillators in opposition will be determined by a variable reactance, including inductance and capacitance, in which preferably the capacitance element is adjusted at one side of the balancing unit to attain the controlling frequency of its associated oscillator while the motor controlled by the differences of frequency automatically adjusts the capacitance in the other side of the balancing unit until the frequencies of both sides are equal.

With the equipment above described, it is apparent that the Cargo Loading Supervisor would know, after making the necessary settings of the equipment based on the type aircraft and the cargo weight, definitely just what weight was to be loaded into each compartment to be loaded, in order that the final center of gravity would be approximately the one desired for optimum take-off, flight and landing conditions.

If, as is usual, a compartment cannot feasibly be loaded with the exact weight indicated by the cargo loading director, the invention nevertheless automatically compensates for the divergencies incurred in the loading in each compartment so that the center of gravity of the loaded aircraft is nevertheless well within safe limits.

According to a preferred embodiment shown, the loading of consecutive compartments maintains the distance of the center of gravity from the reference datum at all times at approximately a desired center of gravity which is midway between the permissible limits of the MAC. Accordingly, in the event that the weight of cargo to be loaded into the last compartment of the aircraft should differ from the optimum weight for such compartment, the distance of the final center of gravity from the reference datum would be greater or less than that desired. If this should occur, after the last compartment is loaded, as the Cargo Loading Supervisor has before him the manufacturer's limits of the MAC, he can tell without need for consultation with the Weights & Balances Division of the airport or of any calculations, whether the actual final center of gravity which he can read on the drum 38 of bridge B–2 is such that the aircraft can take-off, fly and land safely.

Although the equipment has been described for use in the actual loading of an aircraft, it is readily apparent that by merely utilizing relatively small weighing scales and placing a model aircraft on such scales, the equipment can be used for training purposes. Thus, models of various items of cargo made to the same scale of weight and dimension as the aircraft, could be loaded into the model aircraft and the calibrations on the drums would be correspondingly changed if required.

With the use of the equipment for training purposes, it is apparent that model aircraft could be made corresponding to all of the types of aircraft being used and the trainees could be rapidly taught just how loading of various types of cargo should be distributed into such aircraft for a final center of gravity that is within the permissible limits of the MAC.

It is also within the scope of the invention to replace the scales with suitable switches or pushbuttons which would place resistance in circuit correlated with the weights to be loaded.

In the illustrative embodiment herein described, it has been assumed that the compartments of the aircraft all could carry the same weight, i. e., 5,000 pounds and the charts shown in Figs. 5, 6 and 7 have been prepared on this basis.

Certain aircraft however cannot carry equal loads in all compartments. Thus, for example, in an aircraft having thirteen compartments C—O inclusive, the first ten compartments each may have a capacity of 4,500 pounds whereas the last three have a capacity of 1,500 pounds each.

In such case, in forming the charts, the slope lines for the first ten compartments are formed as above described by multiplying the weight in each compartment, i. e. 4,500 pounds by the centroid of such compartments. The last slope line is formed by multiplying the combined weight in the last three compartments, i. e., 4,500 pounds by the centroid of such three compartments.

The compartment selector switch in such case has positions for such last three compartments M, N and O in the illustrative embodiment and successively switches into circuit resistors 280 which have a value of 3, 2 and 1 ohm respectively. Thus, assuming that the remaining weight is 4,500 pounds and compartment "M" is to be loaded, when the selector switch is in compartment "M" position, the arm 248 will complete a circuit through resistor 280 of 3 ohms so that the compartment director bridge will indicate 1,500 pounds in the manner previously described.

After such compartment has been loaded, the remaining weight will be 3,000 pounds and when the selector switch is moved to compartment "N" position, resistor 280 having a value of 2 ohms will be connected into circuit so that the compartment loading director bridge B-13 will indicate 1,500 pounds as the weight to be loaded and so on.

It is of course to be understood that the compartments carrying the smaller weights can be at the front, rear or at an intermediate position along the aircraft.

As many changes could be made in the above apparatus, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment for loading a given cargo weight into an aircraft for desired center of gravity of the loaded aircraft, said equipment comprising a control circuit which includes (a) a variable electrical unit and means for setting said unit to a value proportional to the weight of cargo still to be loaded into the aircraft, (b) a second variable electrical unit and means to set said second unit to a value proportional to the moment of such weight with respect to a given reference datum, (c) a third variable electrical unit and means to set said third variable electrical unit to a value related to the values of the first two variable electrical units, selector means under the control of the means to set said third variable electrical unit, to be set to a position determined by the setting of said third variable electrical unit, a multiplicity of circuits corresponding to a plurality of various possible sequences of consecutive compartments among which the entire cargo load might be distributed, said circuits being in groups, each group including a number of circuits corresponding to the various numbers of compartments in the various sequences that start with a given compartment, said selector means setting up for completion one circuit of at least one group of said circuits, means for selectively completing that one of the circuits thus set up, which corresponds to the first of one of said possible sequences, a compartment loading director having an indicator and including means under control of the selected circuit and means under control of the cargo weight still to be loaded for conjointly establishing a setting of said indicator which corresponds to said cargo weight divided by a factor related to the number of compartments in the selected sequence.

2. The combination recited in claim 1 in which the means for placing into circuit an electrical unit of value proportional to the weight of cargo still to be loaded, comprises weight determining means, means controlled by the weight determining means for placing into circuit an electrical unit of value proportional to the weight resting on each wheel of the aircraft, means for electrically adding such units and placing into circuit an electrical unit of value proportional to the total weight of the aircraft resting on such wheels, means for setting into circuit an electrical unit of value proportional to the sum of the total cargo weight to be loaded and the weight of the aircraft prior to such loading, an electrical circuit for effecting interaction of the electrical units related to the sum and the total weight, to determine the difference between such sum and such total weight, and means controlled by said electrical circuit for placing into circuit an electrical unit of value proportional to such difference which is equal to the weight of cargo still to be loaded.

3. The combination recited in claim 1 in which the means for placing into circuit an electrical unit of value proportional to the moment of the weight of cargo still to be loaded into the aircraft, comprises weight determining means, means controlled by the weight determining means for placing into circuit an electrical unit of value proportional to the weight resting on the main wheels of the aircraft, means for setting into circuit an electrical unit of value proportional to the distance between the nose wheel and the main wheels along the longitudinal axis of the aircraft, a control circuit connected for control conjointly by such two electrical units, a variable electrical unit controlled by said control circuit to be set to a value proportional to the product of such two units, means for setting into circuit an electrical unit of value proportional to the sum of the weight of the aircraft prior to loading of cargo and the weight of such cargo, means for setting into circuit an electrical unit of value proportional to the distance from the nose wheel of the aircraft to a desired position of the center of gravity, a control circuit connected for control conjointly by such two last named electrical units, a variable electrical unit controlled by said control circuit to be set to a value proportional to the product of such two units, an electrical circuit connected for control conjointly by the electrical units related to such two products to determine the difference therebetween, and means controlled by said electrical circuit for placing into circuit an electrical unit of value proportional to such difference which is equal to the moment of the weight of cargo still to be loaded.

4. The combination recited in claim 1 in which said compartment loading director comprises a bridge circuit which has a variable impedance unit in one arm of said bridge, each of the circuits of said one or more groups of circuits has an impedance unit of value proportional to the number of compartments in the group, the means for completing that one of the circuits set up, connecting in the opposed arm of the bridge said impedance unit of value proportional to the number of compartments in the selected sequence, a variable impedance unit in the third arm of said bridge, means under control of the cargo weight still to be loaded to set said last named variable impedance unit, and an impedance unit of predetermined value in the fourth arm of said bridge, and means controlled by unbalance of said bridge to set said first variable impedance unit to a value equal to the quotient of the value of said third variable impedance unit multiplied by the value of said predetermined resistance, divided by the value of said second variable impedance unit, whereby said first variable impedance unit will be set to a value proportional to the remaining cargo weight divided by the number of compartments in the selected sequence.

5. The combination set forth in claim 1 in which each electrical unit is an impedance.

6. The combination set forth in claim 1 in which each electrical unit is an ohmic resistor.

7. The combination set forth in claim 1 in which each electrical unit includes a capacitance.

8. The combination set forth in claim 1 in which each electrical unit includes an inductance.

9. The combination recited in claim 1 in which weight determining means are provided adapted to be associated with the wheels of the aircraft, means controlled by the weight determining means for placing into circuit electrical units of value proportional to the weight resting on each wheel of the aircraft, means for electrically adding such units and for placing into circuit an electrical unit of value proportional to the total weight of the aircraft resting on such wheels prior to loading of cargo into the next compartment to be loaded, means associated with said last named electrical unit for automatically disconnecting it from circuit before the loading of such next compartment has commenced, means controlled by said weight determining means for placing into circuit an electrical unit of value proportional to the total weight of the aircraft at every stage of its loading and circuit means correlating said two electrical units related to the total weight of the aircraft, said circuit means including a third electrical unit set by said circuit means to a value corresponding to the difference between the values of said two electrical units and corresponding to the weight loaded in the individual compartment next in the sequence.

10. The combination recited in claim 1 in which weight determining means are provided adapted to be associated with the wheels of the aircraft, means controlled by the weight determining means for placing into circuit electrical units of value proportional to the weight resting on each wheel of the aircraft, means for electrically adding such units and placing into circuit an electrical unit of value proportional to the total weight of the aircraft resting on such wheels prior to loading of cargo into the aircraft, means controlled by said weight determining means for placing into circuit an electrical unit of value proportional to the total weight of the aircraft at every stage of its loading, means to disconnect the electrical unit related to the weight of the aircraft prior to the loading of cargo before such cargo is loaded in order to maintain such unit set to a value proportional to the weight of the aircraft at such time, an electrical circuit correlating the electrical units related to the total weight of the aircraft at any time and the total weight prior to loading of cargo and a third electrical unit controlled by said electrical circuit to be set to a value equal to the difference between such two weights which corresponds to the accumulated cargo weight at all stages of loading.

11. The combination recited in claim 1 in which the division of cargo weight by the number of compartments in the selected sequence is effected by one of a plurality of electrical units, the number of electrical units corresponding to the number of groups of circuits, each electrical unit being of value proportional to the number of compartments in the selected sequence, and such selected electrical unit is correlated with an electrical unit of value proportional to the remaining cargo weight to determine the setting of the indicator.

12. The combination recited in claim 11 in which each electrical unit is an impedance.

13. The combination recited in claim 1 in which the control circuit for effecting correlation of the electrical units of value proportional respectively to the weight of cargo still to be loaded and the moment of such weight comprises a self-balancing bridge circuit in which the two electrical units of weight and moment form two arms of the bridge, a variable electrical unit is in the arm of the bridge opposed to the electrical moment unit, and means controlled by unbalance of such bridge serves to set the variable electrical unit to a value proportional to the quotient of the weight unit divided by the moment unit.

14. The combination recited in claim 13 in which the adjustable means under control of the means controlled by unbalance of said bridge comprises a contact arm having a plurality of rows of contact segments associated therewith, said contact arm being correlated with said rows of contacts to engage no more than one segment on one or more of said rows at any time.

15. The combination recited in claim 13 in which the adjustable means under control of the means controlled by unbalance of said bridge comprises a contact arm having associated therewith a plurality of concentric arcuate rows of contact segments, said contact arm being of width to engage no more than one segment on one or more of said arcuate rows at any time.

16. The combination recited in claim 13 in which the group of circuits corresponding to the various possible groups of consecutive compartments all pass through a control unit which has contacts arranged in rows corresponding to the respective groups and in which the adjustable means under control of the means controlled by unbalance of said bridge comprises a contact arm that extends across the various rows of contacts and engages no more than one contact on one or more of said rows.

17. The combination recited in claim 13 in which the group of circuits corresponding to the various groups of consecutive compartments all pass through a control unit which has contacts arranged in rows corresponding to the respective groups, in which the adjustable means under control of the means controlled by unbalance of said bridge comprises a contact arm that extends across the various rows of contacts and at any time engages no more than one contact on one or more of said rows, in which the division of cargo weight by the number of compartments in the selected sequence is effected by one of a plurality of electrical units, the number of units corresponding to the number of groups of circuits, each electrical unit being of value proportional to the number of compartments in the selected sequence, and such selected electrical unit is correlated with an electrical unit of value proportional to the remaining cargo weight to determine the setting of the indicator.

References Cited in the file of this patent

UNITED STATES PATENTS

| | | |
|---|---|---|
| 2,686,426 | Kolisch | Aug. 17, 1954 |
| 2,686,634 | Kolisch | Aug. 17, 1954 |